(12) United States Patent
Wibben

(10) Patent No.: US 8,564,155 B2
(45) Date of Patent: Oct. 22, 2013

(54) MULTIPLE OUTPUT POWER SUPPLY

(75) Inventor: Josh Wibben, Eden Prairie, MN (US)

(73) Assignee: Polar Semiconductor, Inc., Bloomington, MN (US)

( * ) Notice: Subject to any disclaimer, the term of this patent is extended or adjusted under 35 U.S.C. 154(b) by 424 days.

(21) Appl. No.: 12/800,094

(22) Filed: May 6, 2010

(65) Prior Publication Data

US 2010/0283322 A1    Nov. 11, 2010

Related U.S. Application Data

(60) Provisional application No. 61/175,976, filed on May 6, 2009, provisional application No. 61/255,408, filed on Oct. 27, 2009.

(51) Int. Cl.
*H02J 1/00* (2006.01)
*H05B 37/00* (2006.01)

(52) U.S. Cl.
USPC .............. 307/31; 315/121; 315/294; 315/307

(58) Field of Classification Search
None
See application file for complete search history.

(56) References Cited

U.S. PATENT DOCUMENTS

| | | | |
|---|---|---|---|
| 5,119,013 A | 6/1992 | Sabroff | |
| 5,400,239 A | 3/1995 | Caine | |
| 5,617,015 A | 4/1997 | Goder et al. | |
| 5,751,139 A | 5/1998 | Jordan et al. | |
| 6,075,295 A | 6/2000 | Li | |
| 6,222,352 B1 | 4/2001 | Lenk | |
| 6,522,108 B2 | 2/2003 | Prager et al. | |
| 6,864,641 B2 | 3/2005 | Dygert | |
| 6,977,447 B2 | 12/2005 | May | |
| 7,242,152 B2 * | 7/2007 | Dowling et al. | 315/291 |
| 7,256,568 B2 | 8/2007 | Lam et al. | |
| 7,265,504 B2 | 9/2007 | Grant | |
| 7,432,614 B2 | 10/2008 | Ma et al. | |
| 2002/0070914 A1 * | 6/2002 | Bruning et al. | 345/102 |
| 2004/0135562 A1 | 7/2004 | Oden | |
| 2004/0201281 A1 | 10/2004 | Ma et al. | |
| 2006/0034023 A1 | 2/2006 | May | |
| 2006/0214646 A1 | 9/2006 | Huang | |
| 2007/0121350 A1 | 5/2007 | Duvnjak | |
| 2007/0262760 A1 | 11/2007 | Liu | |
| 2008/0001547 A1 | 1/2008 | Negru | |
| 2008/0054815 A1 | 3/2008 | Kotikalapoodi et al. | |
| 2008/0100232 A1 * | 5/2008 | Miguchi | 315/294 |
| 2008/0231115 A1 | 9/2008 | Cho et al. | |
| 2009/0322234 A1 | 12/2009 | Chen et al. | |

FOREIGN PATENT DOCUMENTS

| GB | 2449616 A | 9/2008 |
|---|---|---|
| JP | 2007027316 A | 2/2007 |

OTHER PUBLICATIONS

G. Spiazzi et al., "High-Quality rectifiers with high-frequency insulation—an overview," IEEE Symp. Industrial Electronics, Jul. 1995.

J. Qian, "Advanced Single-State Power Factor Correction Techniques," Virginia Polytechnic Institute and State University Dissertation, Sep. 1997.

(Continued)

*Primary Examiner* — Hal Kaplan
(74) *Attorney, Agent, or Firm* — Kinney & Lange, P.A.

(57) ABSTRACT

A method is provided for supplying power to multiple output channels. Channel control signals are monitored to determine a state for each of the output channels. Each channel control signal is associated with one of the output channels. The energy in a storage element is directed to output channels according to the state of the channel control signals.

39 Claims, 16 Drawing Sheets

(56) References Cited

OTHER PUBLICATIONS

R. Erickson et al., Fundamentals of Power Electronics, 2nd ed. Berlin, Germany: Springer: 2001; pp. 144-146, 149, 153-155, 161.
M.W. May et al., "A synchronous dual-output switching dc-dc converter using multiple noise-shaped switch control," in Dig. Tech. Papers IEEE Int. Solid-State Circuits Conf., Feb. 2001, pp. 358-359.
D. Ma et al., "A 1.8V single inductor dual-output switching converter for power reduction techniques," in Dig. Tech. Papers IEEE VLSI Symp. Circuits, Jun. 2001, pp. 137-140.
W.H. Ko et al., "Single inductor multiple-output switching converters," in Proc. IEEE PESC, vol. 1, Jun. 2001, pp. 226-231.
D. Ma et al., "A pseudo-CCM/DCM SIMO switching converter with freewheel switching," IEEE Dig. Tech. Papers, Feb. 2002, pp. 390-391.
D. Ma et al., "Single-inductor multiple-output switching converters with time-multiplexing control in discontinuous conduction mode," IEEE J. Solid-State Circuits, vol. 38, pp. 89-100, Jan. 2003.
D. Ma et al., "A pseudo-CCM/DCM SIMO switching converter with freewheel switching," IEEE J. Solid-State Circuits, vol. 38, No. 6, pp. 1007-1014, Jun. 2003.
S.C. Koon et al., "Integrated charge-control single-inductor dual-output step-up/step-down converter," IEEE 2005, pp. 3071-3074.
D. Trevisan et al., "Digital control of single-inductor dual-output dc-dc converters in continuous-conduction mode," IEEE 2005, pp. 2616-2622.
Sharma, Y.S. Pavan, A single inductor multiple output converter with adaptive delta current mode control, ISCAS 2006, pp. 5643-5646.
H.P. Le et al., "A single-inductor switching DC-DC converter with five outputs and ordered power distributing control," IEEE J. Solid-State Circuits, vol. 42, No. 12, pp. 2706-2714, Dec. 2007.
H.P. Le, "A single-inductor switching DC-DC converter with 5 outputs and ordered power distributing control," IEEE ISSCC 2007.
C.S. Chae et al., "A single-inductor step-up DC-DC switching converter with bipolar outputs for active matrix OLED mobile display panels," in IEEE ISSCC Dig. Tech. Papers, Feb. 2007, pp. 136-137.
E. Bonizzoni et al., "A 200mA 93% Peak Efficiency Single-inductor Dual-Output DC-DC Buck Converter," IEEE ISSCC, 2007, pp. 526-527.
N. Mohan, First Course on Power Electronics and Drives; Minneapolis, MN: MNPERE, 2007, pp. 3-6-3-11, 8-2-8-3, 8-6, 8-9.
Pizzutelli et al., "Novel control technique for single inductor multiple output converters operating in CCM with reduced cross-regulation," IEEE APEC, Feb. 2008, pp. 1502-1507.
International Search Report and Written Opinion in Application No. PCT/US2011/035192, dated Jan. 30, 2012.

M. Belloni et al., "On the design of single-inductor multiple-output DC-DC buck converters," IEEE ISCAS, May 2008, pp. 3049-3052.
Y.J. Woo et al., "Load independent control of switching DC-DC converters with freewheeling current feedback," IEEE J. Solid-State Circuits, vol. 43, No. 12, pp. 2798-2808, Dec. 2008.
M.H. Huang et al., "Single-Inductor Dual-Output DC-DC Converters with High Light-Load Efficiency and Minimized Cross-Regulation for Portable Devices," IEEE Int'l 2008 Symposium on VLSI Circuits Digest of Technical Papers, pp. 132-133.
M. Belloni et al., "A 4-Output Single-Inductor DC-DC Buck Converter with Self-Boosted Switch Drivers and 1.2A Total Output Current," IEEE ISSCC, 2008, pp. 444-445.
C.S. Chae et al., "A single-inductor step-up DC-DC switching converter with bipolar outputs for active matrix OLED mobile display panels," IEEE J. Solid-State Circuits, vol. 44, No. 2, pp. 509-524, Feb. 2009.
P. Green, "International Rectifier Technical Paper for LED EDN Workshop (Chicago, Oct. 2009)," International Rectifier, Oct. 2009.
D. Ma et al., "A single-inductor dual-output integrated DC/DC boost converter for variable voltage scheduling".
J. Betten et al., "Converter face-off: SEPIC vs. flyback," Texas Instruments, http://www.eetasia.com/ART_8800492048_499501_NP-258a9f4c.HTM.
T. Ribarich, "Off-Line LED Control Circuit," International Rectifier.
Datasheet A8500.
Datasheet LT3496.
Datasheet LT3003.
Datasheet LT3466.
Datasheet LT3476.
Datasheet LT3497.
Datasheet LT3595.
Datasheet LT3595A.
Datasheet CAT4106.
Datasheet AN-H52.
Datasheet DN-H05.
Datasheet DN-H06.
Datasheet AN-4151.
Datasheet LT3518.
Datasheet LT3475.
Datasheet LT3598.
Datasheet HV9930.
Datasheet HV9931.
International Search Report and Written Opinion in Application No. PCT/US2011/035171, dated Jan. 17, 2012.
International Preliminary Report on Patentability in application No. PCT/US2011/035192 dated Nov. 6, 2012.
International Preliminary Report on Patentability in application No. PCT/US2011/035171 dated Nov. 6, 2012.

\* cited by examiner

MULTIPLE OUTPUT POWER SUPPLY

CROSS-REFERENCE TO RELATED APPLICATION

Reference is made to U.S. application Ser. No. 12/800,057 entitled "POWER SUPPLY FOR FLOATING LOADS" which is filed on even date and is assigned to the same assignee as this application.

This application claims priority from U.S. Provisional Application Ser. No. 61/175,976 filed May 6, 2009 and U.S. Provisional Application Ser. No. 61/255,408 filed Oct. 27, 2009.

The aforementioned application Ser. Nos. 12/800,057, 61/175,976, and 61/255,408 are hereby incorporated by reference in their entirety.

BACKGROUND

The reduction in size of electronic devices creates a need to minimize off chip circuitry components to reduce component cost and required board size. One of the larger elements typically required in a power supply for electronic devices is an inductor. When a device has multiple loads which have different power requirements, there are two typical options: use multiple power drivers which require multiple inductors, or find a way to use a single inductor for multiple loads.

Single Inductor Multiple Output (SIMO) power supplies have been developed to meet the needs of multiple voltage based loads. For example, a SIMO supply may have a 1.6V, 3.3V, and 5V output driven from a single inductor. Not all loads, however, are voltage dependent. An example of this is a string of light emitting diodes (LEDs). An LED is a current based device which can have a different forward voltage from device to device. A voltage regulated power supply is less than ideal for this type of load. Dimming LEDs generally requires the current supply to be rapidly turned on and off using a pulse width modulation technique. It would be desirable to have a multiple output power supply which could regulate a variety of load types and dim the outputs by pulse width modulation.

SUMMARY

One aspect of the invention provides a method for supplying power to multiple output channels. Channel control signals are monitored to determine a state for each of the output channels. Each channel control signal is associated with one of the output channels. The energy in a storage element is directed to the output channels according to the state of the channel control signals.

DETAILED DESCRIPTION

Existing singe inductor multiple output (SIMO) power supply architectures focus on applications that require a regulated voltage and a variable current. This approach is not optimal for other types of loads such as LEDs. LEDs require a regulated current and have a variable voltage drop.

In the case of voltage regulated loads, a SIMO power supply must respond to a transient current at the load with good cross regulation characteristics. Cross regulation is the error in voltage regulation on a channel that has a static load current when a different channel has had a change in its load current. For the application of an LED load, there are no transient events, though the forward voltage of the LED can change between devices and with temperature. An additional and desirable feature for LEDs is dimming functionality which can be achieved using methods such as pulse width modulation (PWM) or by modulating the regulation point. To do this, the SIMO power supply must be capable of independently turning on and off (enabling and disabling) channels to pulse width modulate the LEDs or to modulate the regulation point in response to control inputs.

Figure 1:
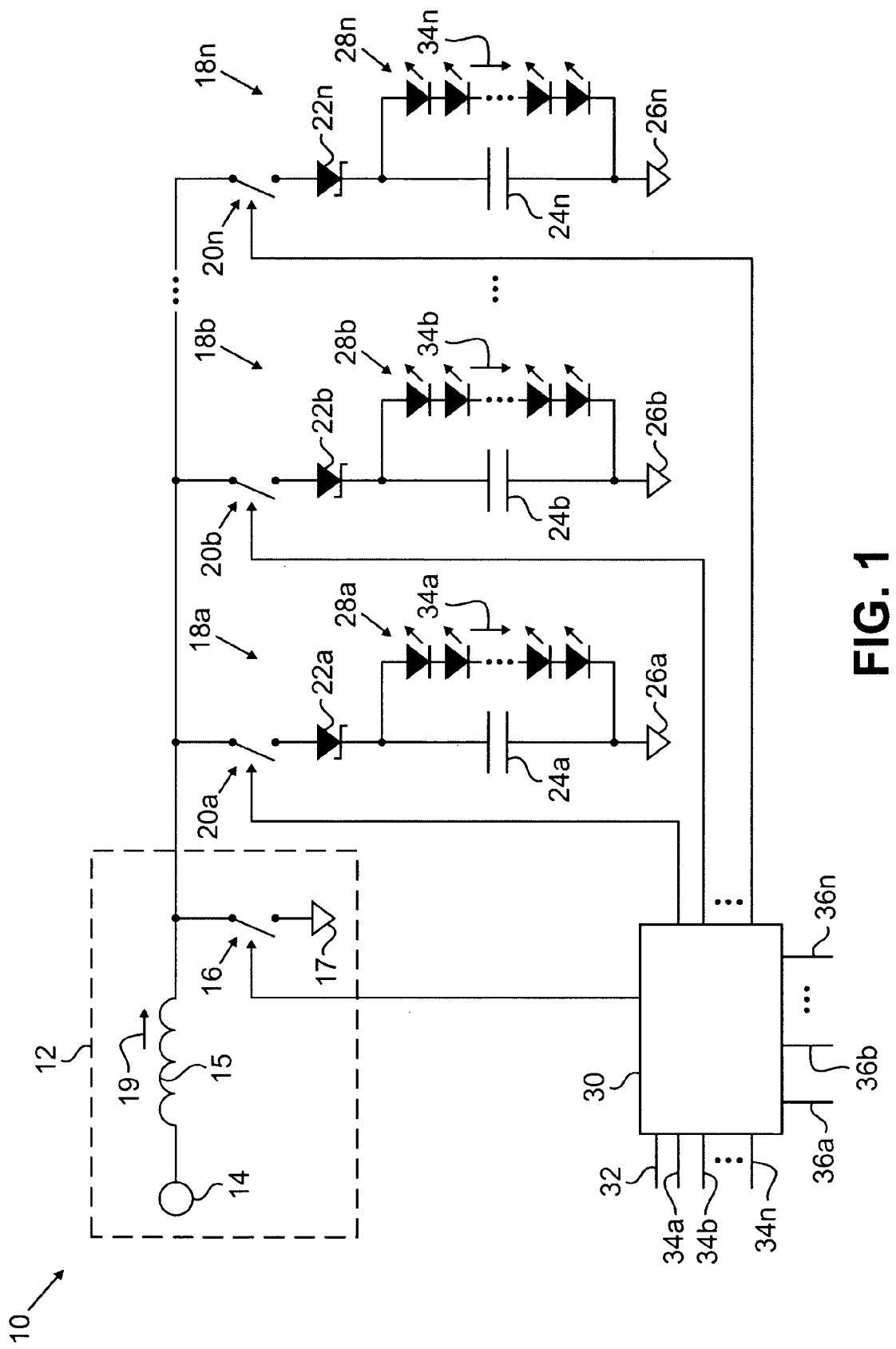
FIG. 1 is a circuit schematic of a boost mode single inductor multiple output (SIMO) power supply.

One embodiment of the present invention is a boost mode SIMO power supply which is illustrated in FIG. 1 as circuit 10. Current supply subcomponent 12 has voltage input 14 connected to inductor 15, and includes main switch 16 to ground contact 17 which stores energy in inductor 15. Current supply subcomponent 12 is connected in parallel with a plurality of output channels 18a-18n. Each output channel 18a-18n has corresponding channel switch 20a-20n connected in series with diodes 22a-22n, the parallel combination of capacitors 24a-24n and loads 28a-28n, and ground contacts 26a-26n. Diodes 22a-22n may not be required if channel switches 20a-20n can block both positive and negative potentials. Diodes may also not be required on every output channel, particularly the channel with the lowest potential since the channel switch will never see a negative potential. Loads 28a-28n, in this case a plurality of LEDs, are connected in parallel with capacitors 24a-24n to sustain a DC current through loads 28a-28n while energy is not being delivered by current supply subcomponent 12. Output channels 18a-18n are individually activated by channel switches 20a-20n to multiplex the energy delivered by current supply subcomponent 12. Switches 16 and 20a-20n are controlled by controller 30 which also monitors inductor current 32 and load currents 34a-n, and responds to channel enable inputs 36a-n to enable PWM dimming of the LED loads.

Figure 2:
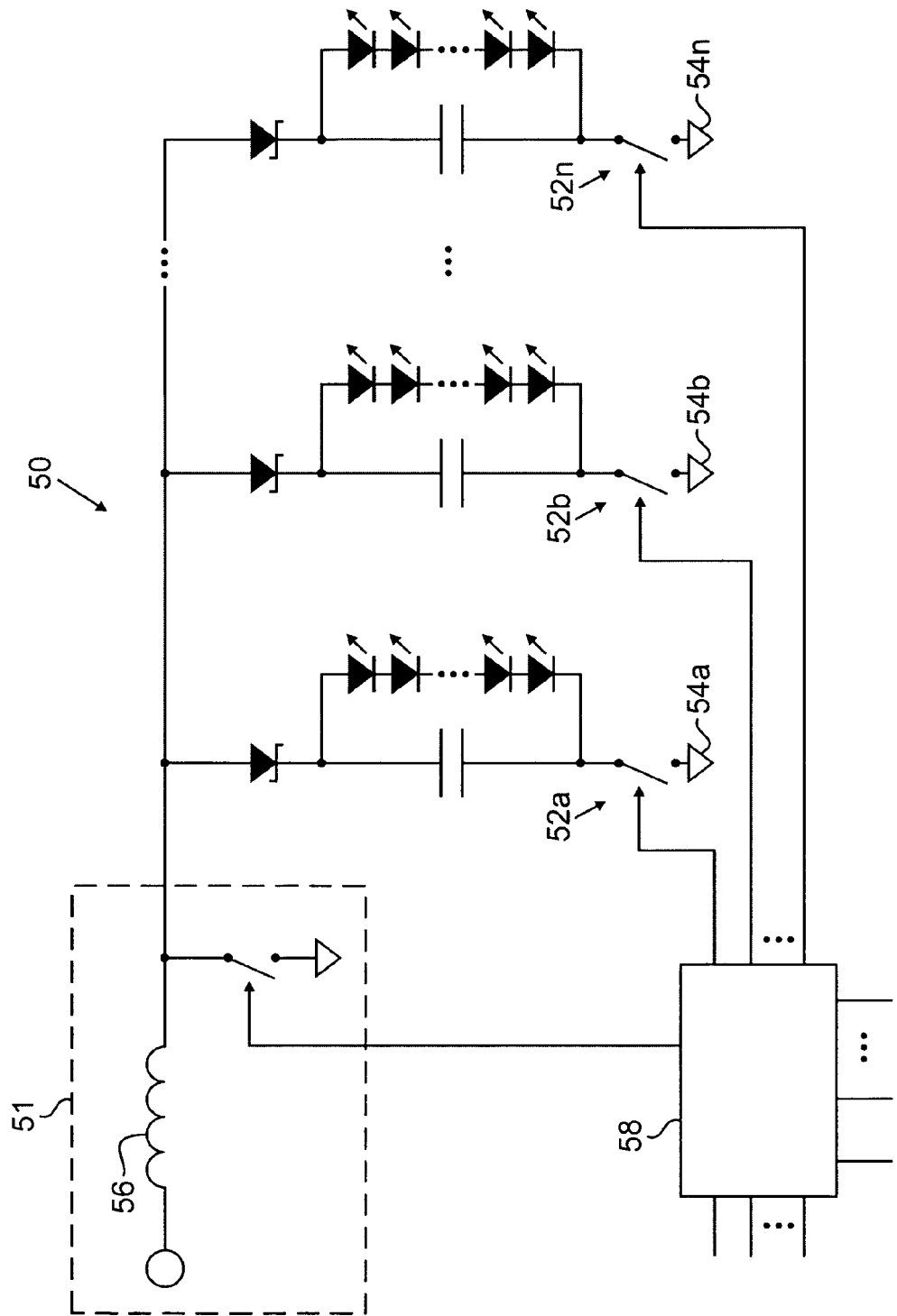
FIG. 2 is a circuit schematic of a boost mode SIMO power supply showing an alternate switch configuration.

FIG. 2 shows circuit 50, another possible embodiment of a boost mode topology SIMO similar to that shown in FIG. 1 with an alternate switch configuration. Current supply subcomponent 51 is the same boost mode configuration as current supply subcomponent 12 of FIG. 1. Here, however, circuit 50 has channel switches 52a-52n adjacent to ground contacts 54a-54n rather than inductor 56. A variety of switch locations are suitable and all switches are operated by controller 58.

Figure 3:
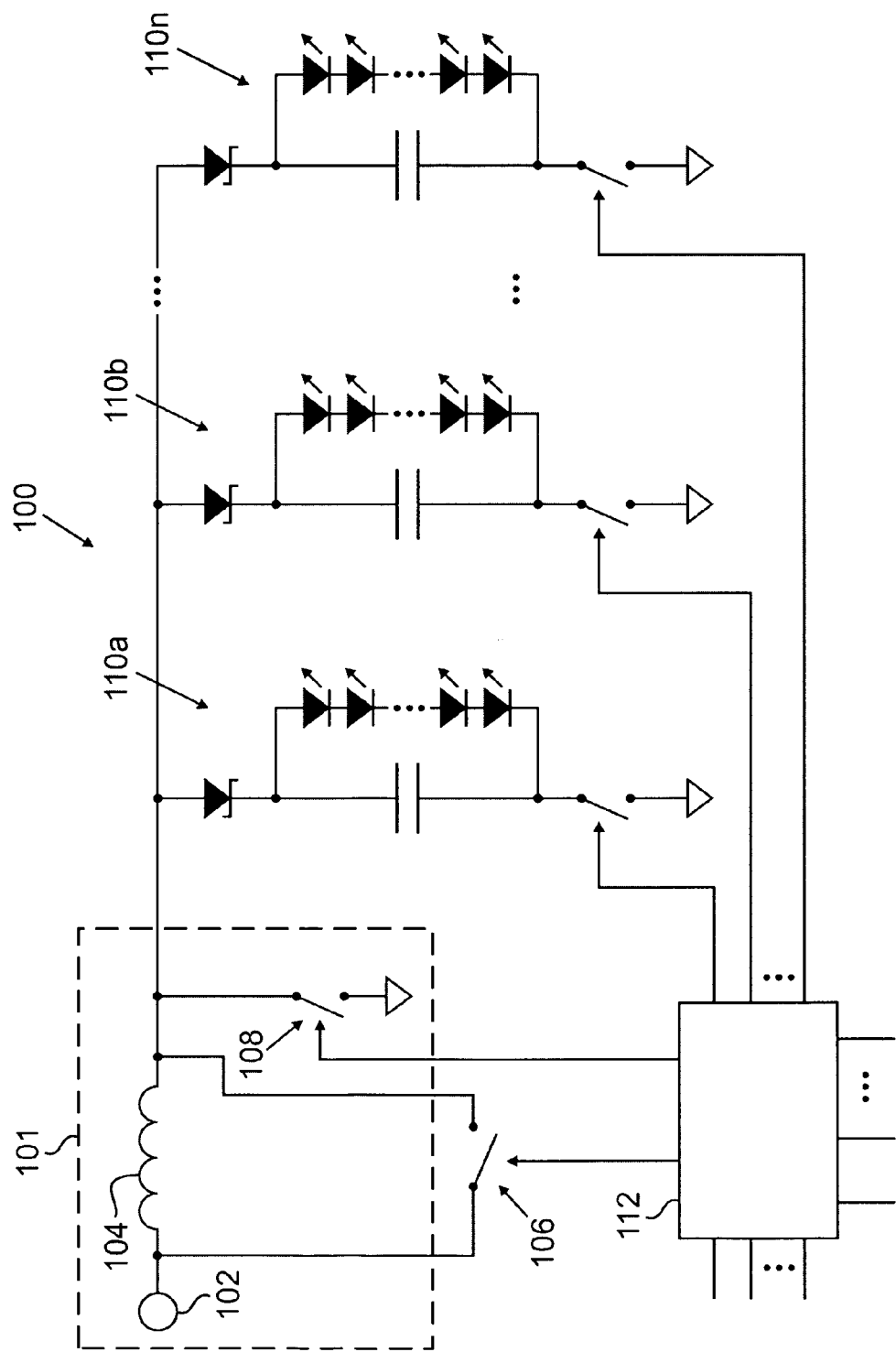
FIG. 3 is a circuit schematic of a boost mode SIMO power supply including a freewheel switch.

FIG. 3 illustrates another possible embodiment with circuit 100 utilizing a boost mode power supply that includes a freewheel switch. Current supply subcomponent 101 with voltage input 102 and inductor 104 has the same boost mode configuration as current supply subcomponent 12 of FIG. 1. In this embodiment an output channel without a load has been added to circuit 100. This additional output channel connects the output of current supply subcomponent 101 back to voltage input 102 through freewheel switch 106. In boost mode configuration this freewheel switch configuration allows inductor 104 to maintain its current by forcing the voltage across inductor 104 to zero (since V/L=di/dt) when not being charged by main switch 108 or supplying power to output channels 110a-110n. The remainder of the circuit (with the exception of an additional output from controller 112 to operate freewheel switch 106), is the same as that described with respect to FIG. 2.

Figure 4:
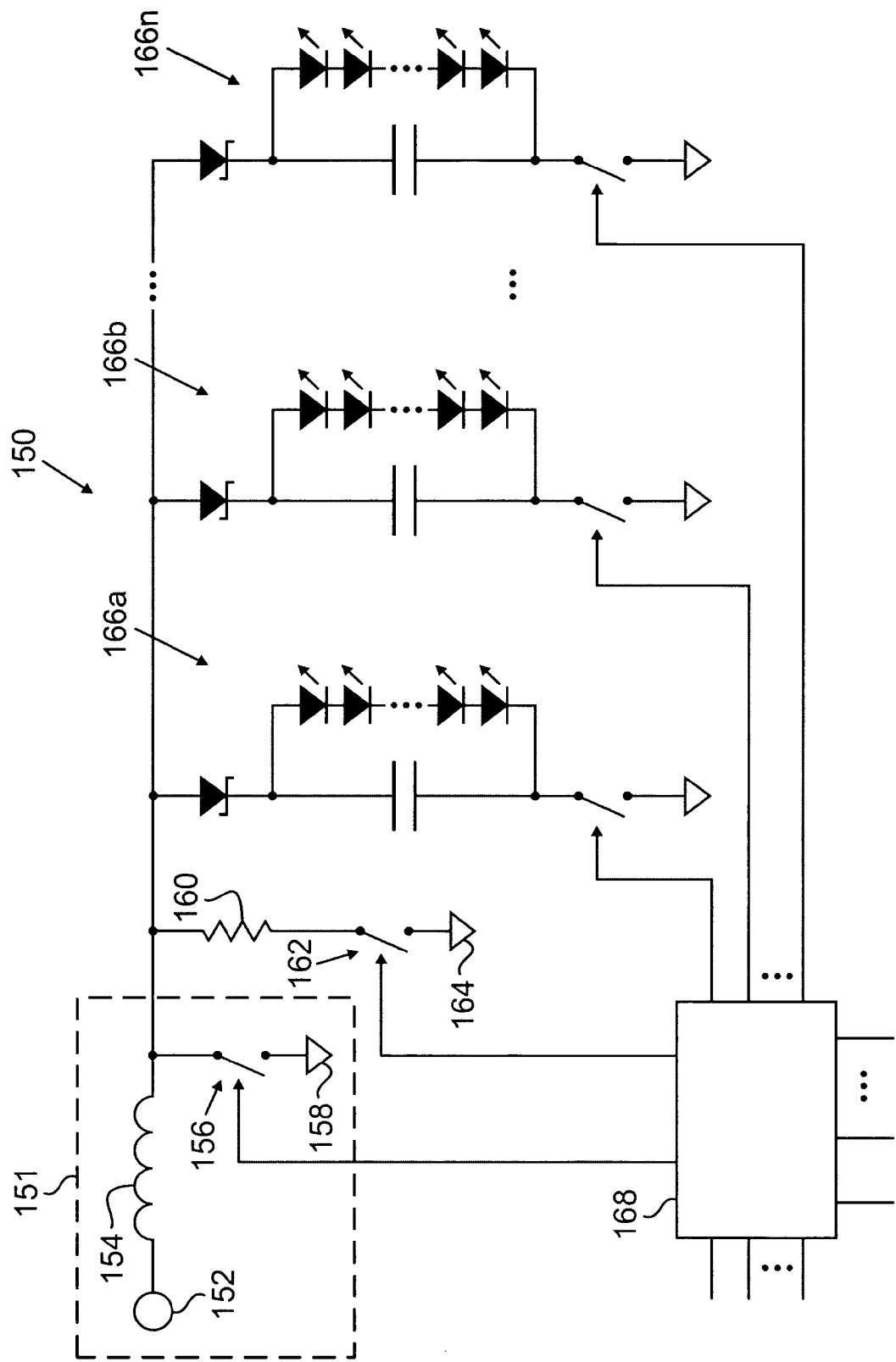
FIG. 4 is a circuit schematic of a boost mode SIMO power supply showing an alternate freewheel switch configuration.

FIG. 4 illustrates an alternative implementation of a freewheel switch with circuit 150 that includes an extra output channel to provide the freewheel function. Current supply subcomponent 151 has voltage input 152 connected to inductor 154 in a boost mode configuration the same as that described with respect to FIG. 1. The other terminal of inductor 154 is connected to the parallel combination of main switch 156 to ground contact 158, resistor 160 to freewheel switch 162 to ground contact 164, and output channels 166a-166n. Freewheel switch 162 maintains the current in inductor 154 by forcing the voltage across inductor 154 close to zero with the voltage drop across resistor 160. This accomplishes the same basic idea of the freewheel circuit shown in FIG. 3 that accommodates inductor current without discharging into an output channel. The difference is that inductor charge is likely not to be maintained, instead it is slowly reduced or increased through the extra output channel. The circuit is operated by controller 168.

Figure 5:
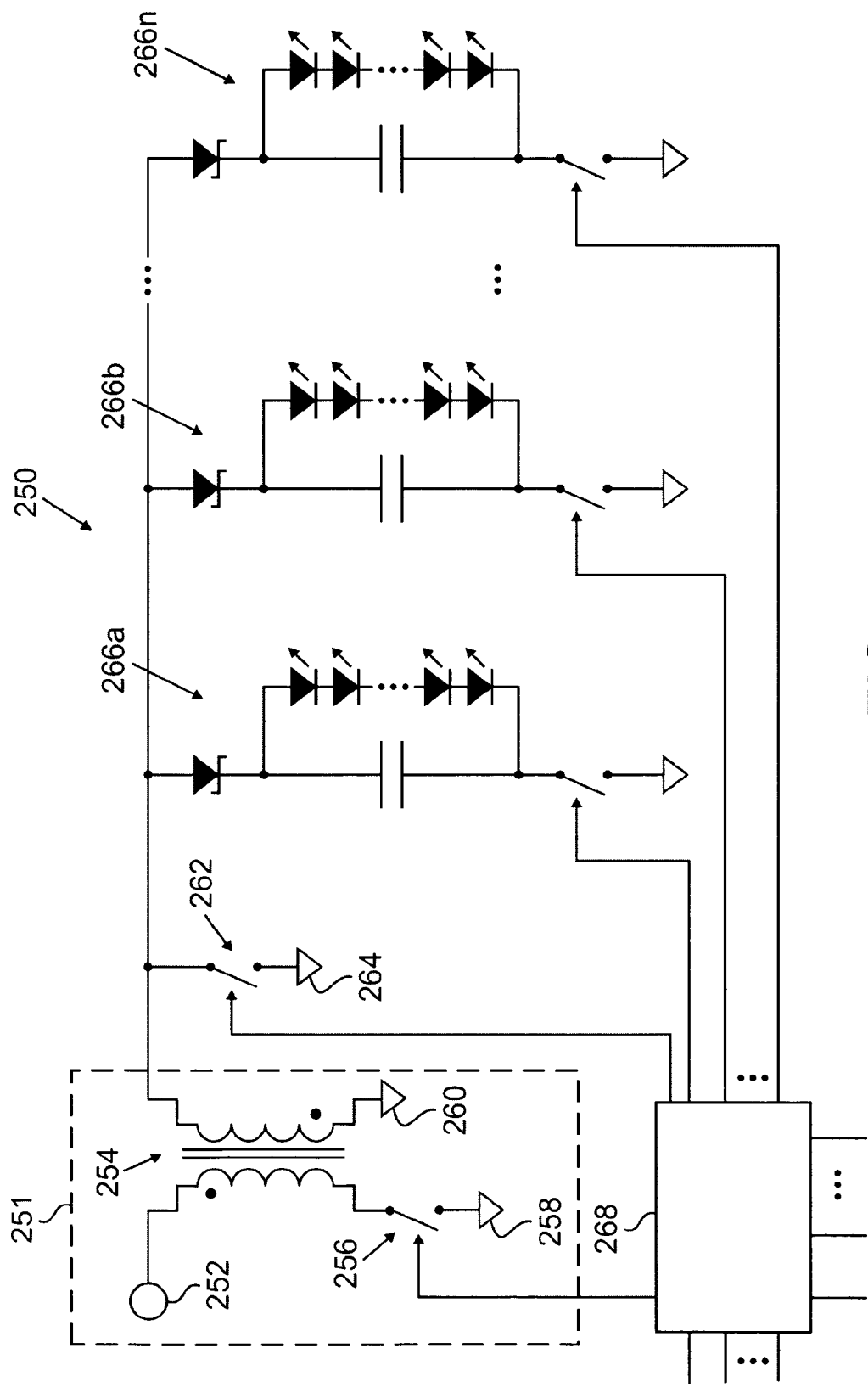
FIG. 5 is a circuit schematic of a flyback SIMO power supply including a freewheel switch.

FIG. 5 illustrates an alternate embodiment using a flyback power supply shown as circuit 250. Current supply subcomponent 251 has voltage input 252 connected with one side of coupled inductor 254 in series with main switch 256 and ground 258. The other side of coupled inductor 254 is connected with ground contact 260. This configuration is known as a flyback power supply. The output of current supply subcomponent 251 is connected to freewheel switch 262 to ground contact 264 and a plurality of output channels 266a-266n. Since the output of coupled inductor 254 is ground referenced, a zero voltage across the inductor is achieved with ground referenced freewheel switch 262. The freewheel switch is not required for all modes of operation and can be removed from circuit 250 in those cases. The circuit is operated by controller 268.

Figure 6:
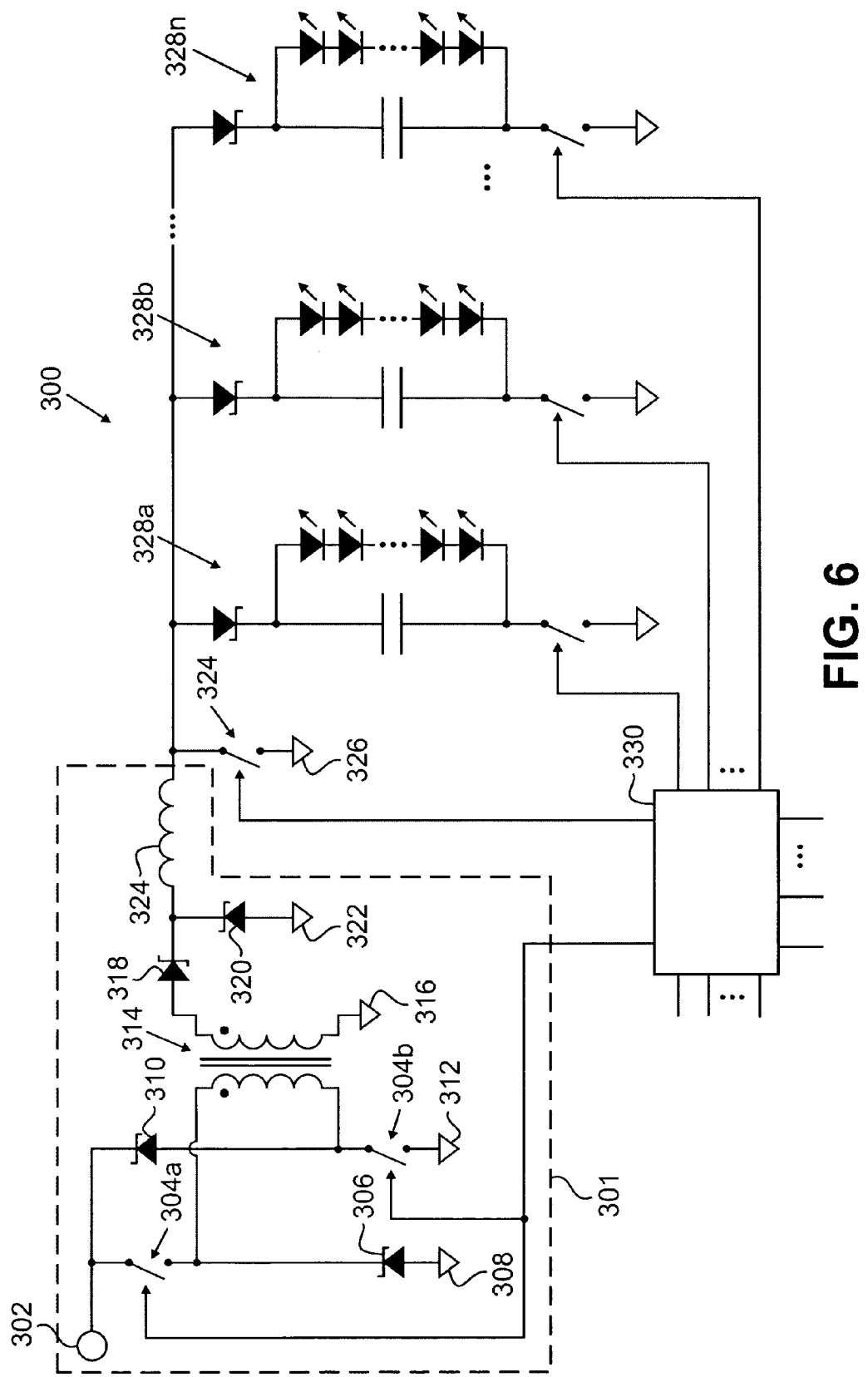
FIG. 6 is a circuit schematic of a forward converter SIMO power supply including a freewheel switch.

FIG. 6 illustrates another possible embodiment utilizing a forward converter power supply in circuit 300. Current supply subcomponent 301 has voltage input 302 that is connected to two parallel legs. The first includes first main switch 304a and reverse biased diode 306 to ground contact 308. The second includes diode 310 and second main switch 304b to ground contact 312. The terminals of the first side of transformer 314 are connected between first main switch 304a and diode 306 and between diode 310 and second main switch 304b. The terminals on the second side of transformer 314 are connected to ground contact 316 and to inductor 324 through diode 318. Diode 318 is also connected to diode 320 to ground contact 322. This configuration of current supply subcomponent 301 is known as a forward converter power supply. The output of current supply subcomponent 301 is connected to the remainder of circuit 300 which includes the parallel combination of output channels 328a-328n and optional freewheel switch 324 to ground contact 326. Controller 330 operates the circuit.

Figure 7:
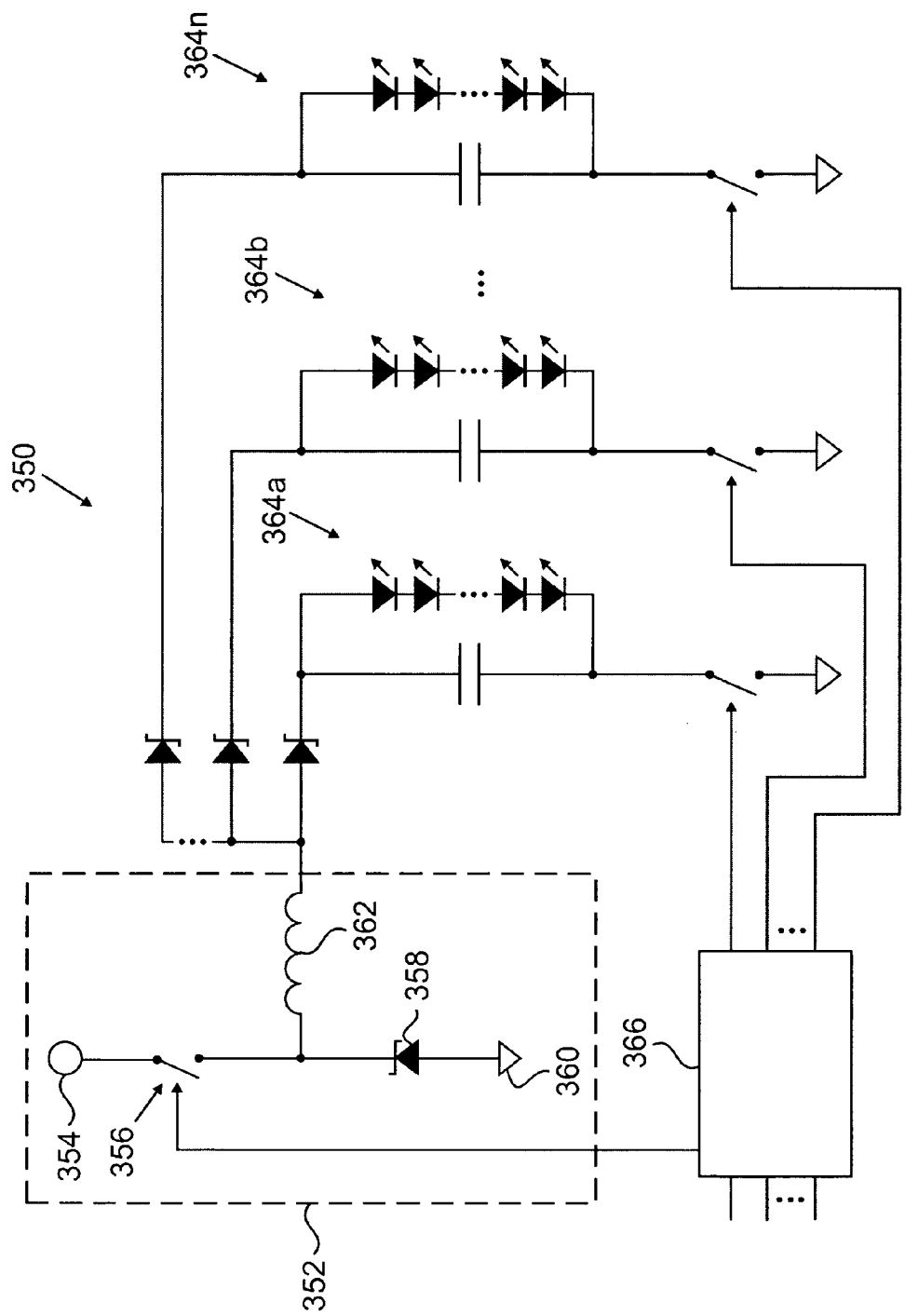
FIG. 7 is a circuit schematic of a buck converter SIMO power supply.

FIG. 7 illustrates another possible embodiment utilizing a buck converter power supply in circuit 350. Current supply subcomponent 352 includes voltage input 354 connected in series with main switch 356, diode 358, and ground contact 360. Inductor 362 is connected between main switch 356 and diode 358 on one terminal and output channels 364a-364n on the other terminal. In this topology, current supply subcomponent 352 delivers energy to output channels 364a-364n while high main switch 356 switch is on and off. When high main switch 356 is on energy is stored in inductor 362, and when high main switch 356 is off the stored energy is discharged into output channels 364a-364n through diode 358. Controller 366 controls the operation of the circuit.

Figure 8:
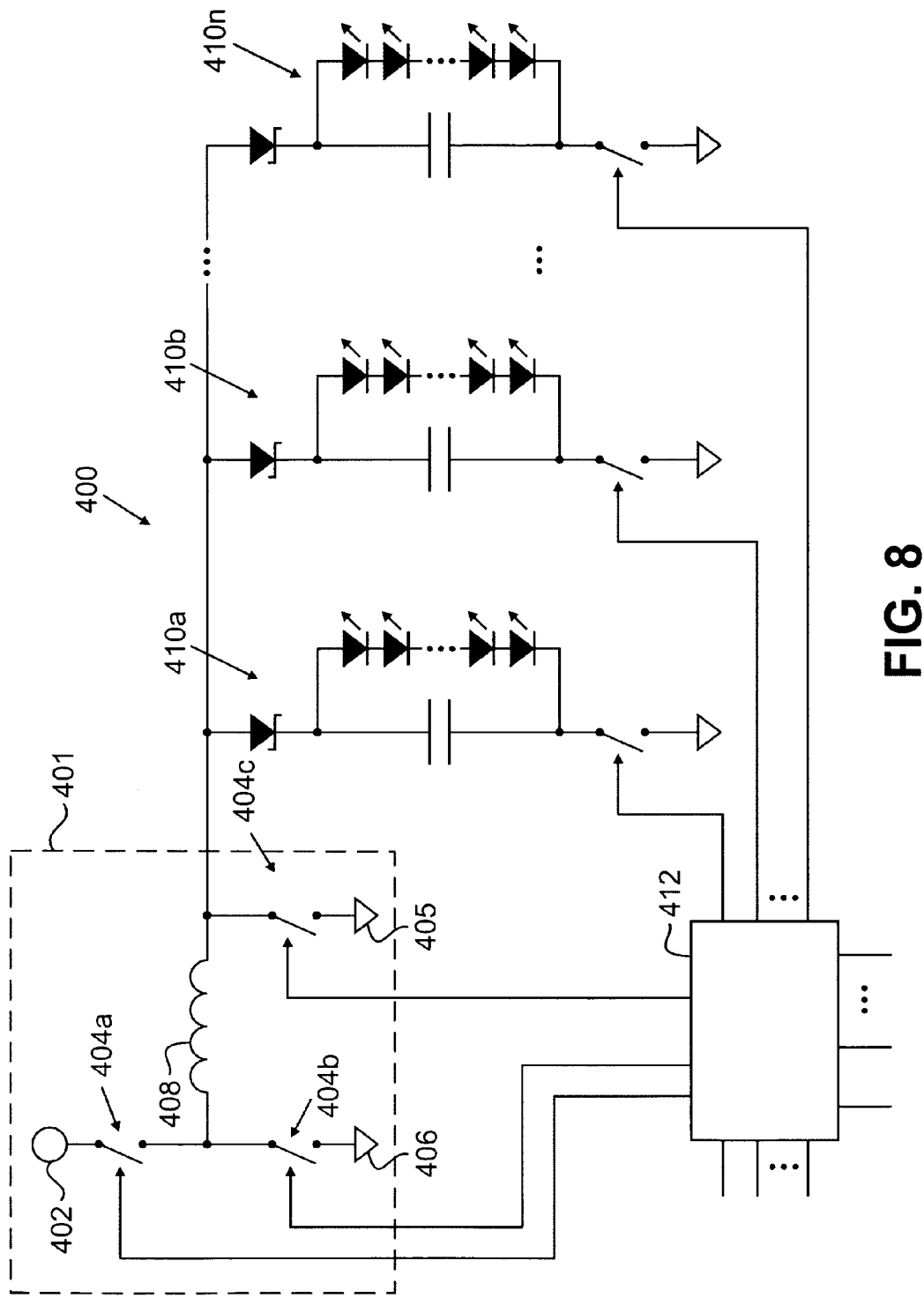
FIG. 8 is a circuit schematic of a buck-boost SIMO power supply.

FIG. 8 illustrates another possible embodiment shown as circuit 400 which has a buck-boost power supply with a freewheel switch. Current supply subcomponent 401 includes voltage input 402 connected in series with high main switch 404a, synchronous rectifier 404b, and ground contact 406. Inductor 408 is connected between high main switch 404a and synchronous rectifier 404b on one terminal and freewheel switch 404c to ground contact 405 on the other terminal. This current supply subcomponent construction can be operated in buck, boost, or buck-boost mode of operation. Current supply subcomponent 401 and its operation are very similar to that of FIG. 7 with the addition of freewheel switch 404c, and synchronous rectifier 404b in place of diode 358. To achieve the freewheel function, synchronous rectifier 404b and freewheel switch 404c are closed. During boost operation, high main switch 404a remains on and synchronous rectifier 404b remains off, while freewheel switch 404c is switched to store and release the energy in inductor 408. For buck-boost operation, the energy is stored in inductor 408 by closing high main switch 404a and freewheel switch 404c. The energy is then released by opening the previously closed switches and turning on synchronous rectifier 404b. Controller 412 controls the operation of the circuit.

Figure 9:
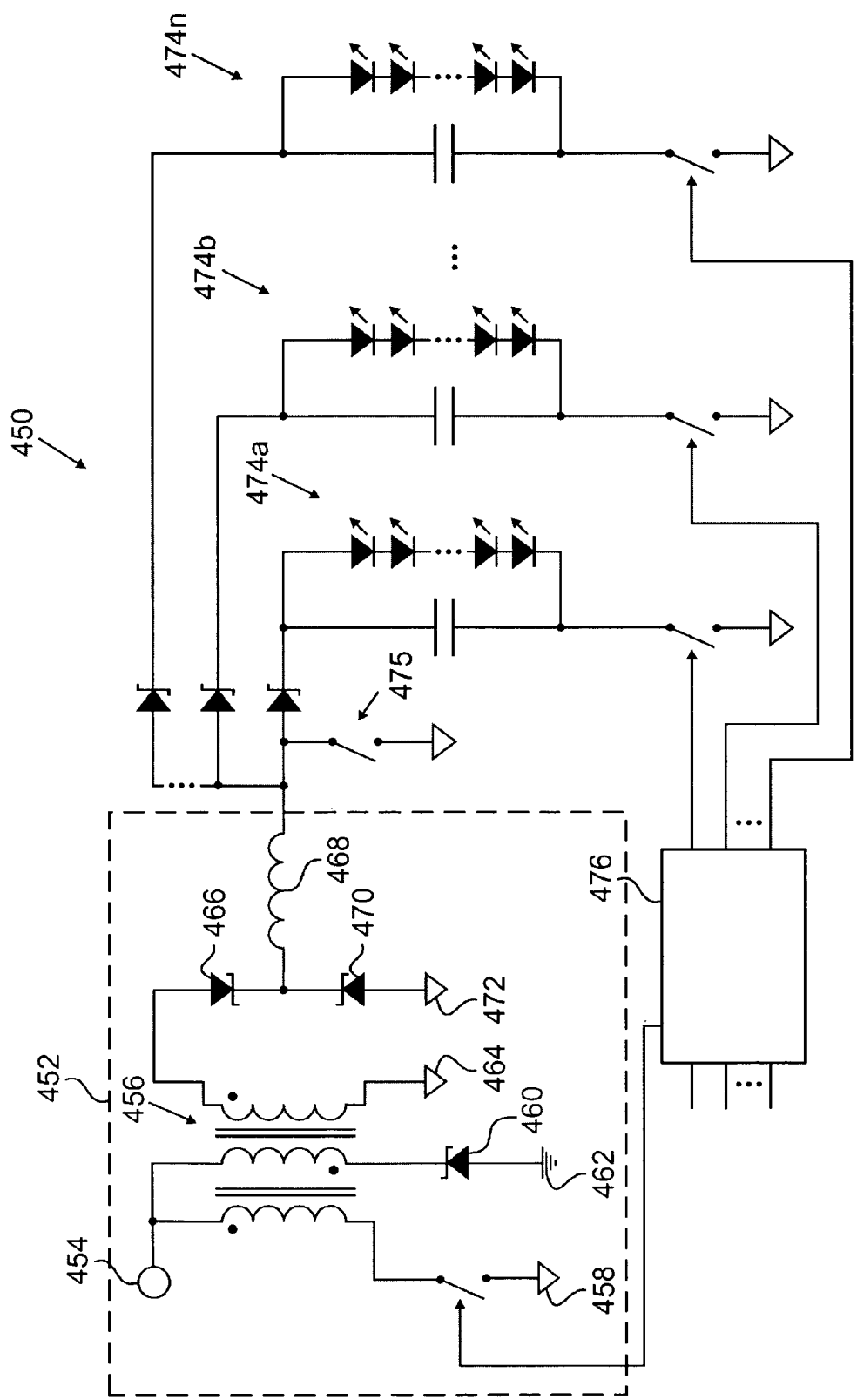
FIG. 9 is a circuit schematic of a forward converter SIMO power supply including a freewheel switch.

FIG. 9 illustrates another possible embodiment shown as circuit 450 which has a forward converter power supply and a freewheel switch. Current supply subcomponent 452 includes voltage input 454 connected to the first and second windings of three winding transformer 456. The first winding of transformer 456 is also connected to main switch 458. The second winding of transformer 456 is also connected through diode 460 to ground contact 462. The third winding of transformer 456 is connected to ground contact 464 and diode 466. Diode 466 is connected to inductor 468 and through diode 470 to ground contact 472. Inductor 468 is connected to output channels 474a-474n and freewheel switch 475. Controller 476 controls operation of the circuit.

Figure 10:
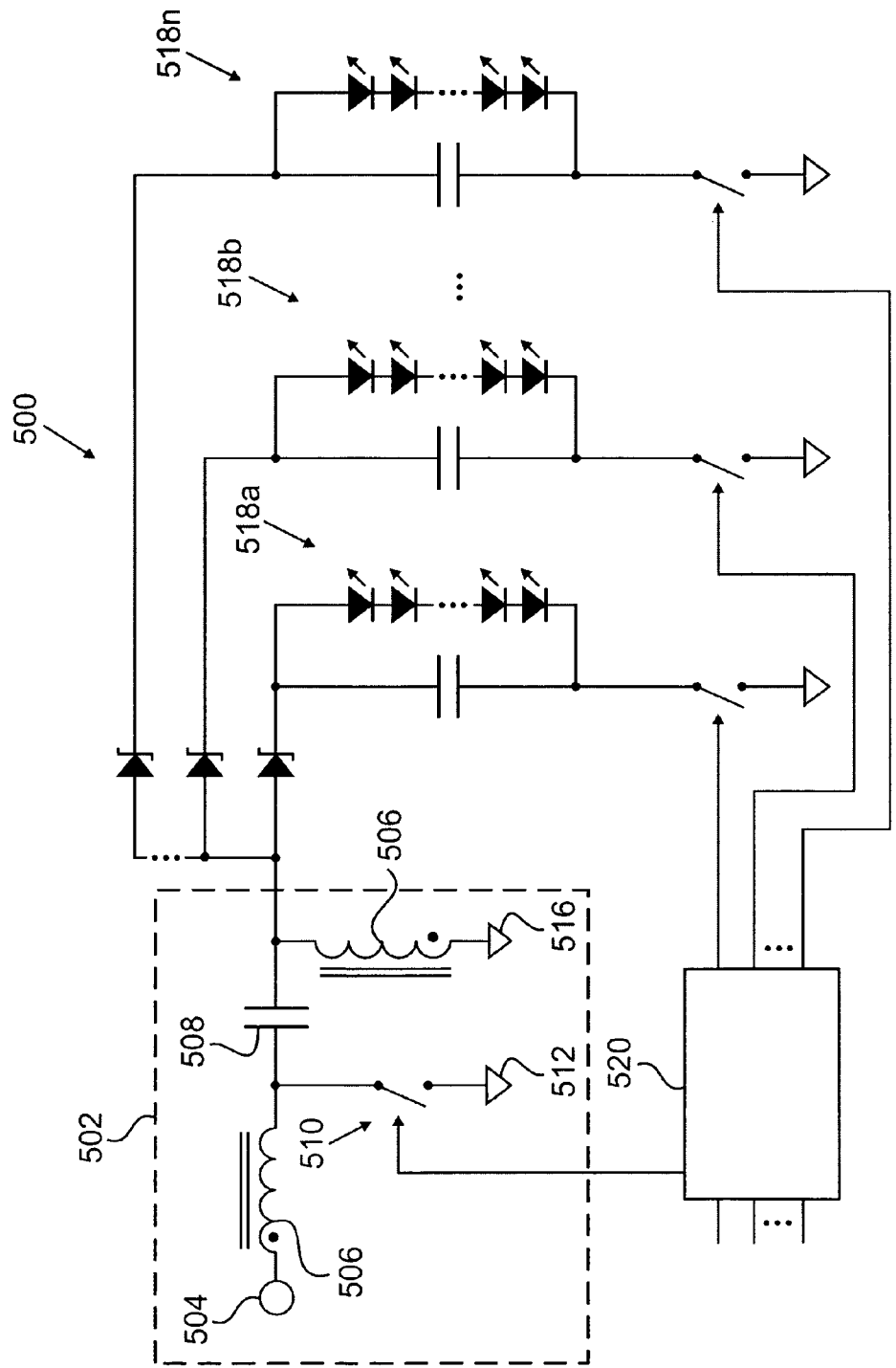
FIG. 10 is a circuit schematic of a SEPIC converter SIMO power supply.

FIG. 10 illustrates another possible embodiment shown as circuit 500 which has a Single Ended Primary Inductor Converter (SEPIC) power supply. Current supply subcomponent 502 has voltage input 504 connected to the primary winding of the coupled inductor 506. The primary winding of the coupled inductor 506 is also connected to capacitor 508 and main switch 510 to ground contact 512. Capacitor 508 is connected to the secondary winding of coupled inductor 506 to ground contact 516 as well as output channels 518a-518n. Circuit 500 is controlled by controller 520. The converter can also be implemented with two discrete inductors that are not coupled in place of coupled inductor 506.

Figure 11:
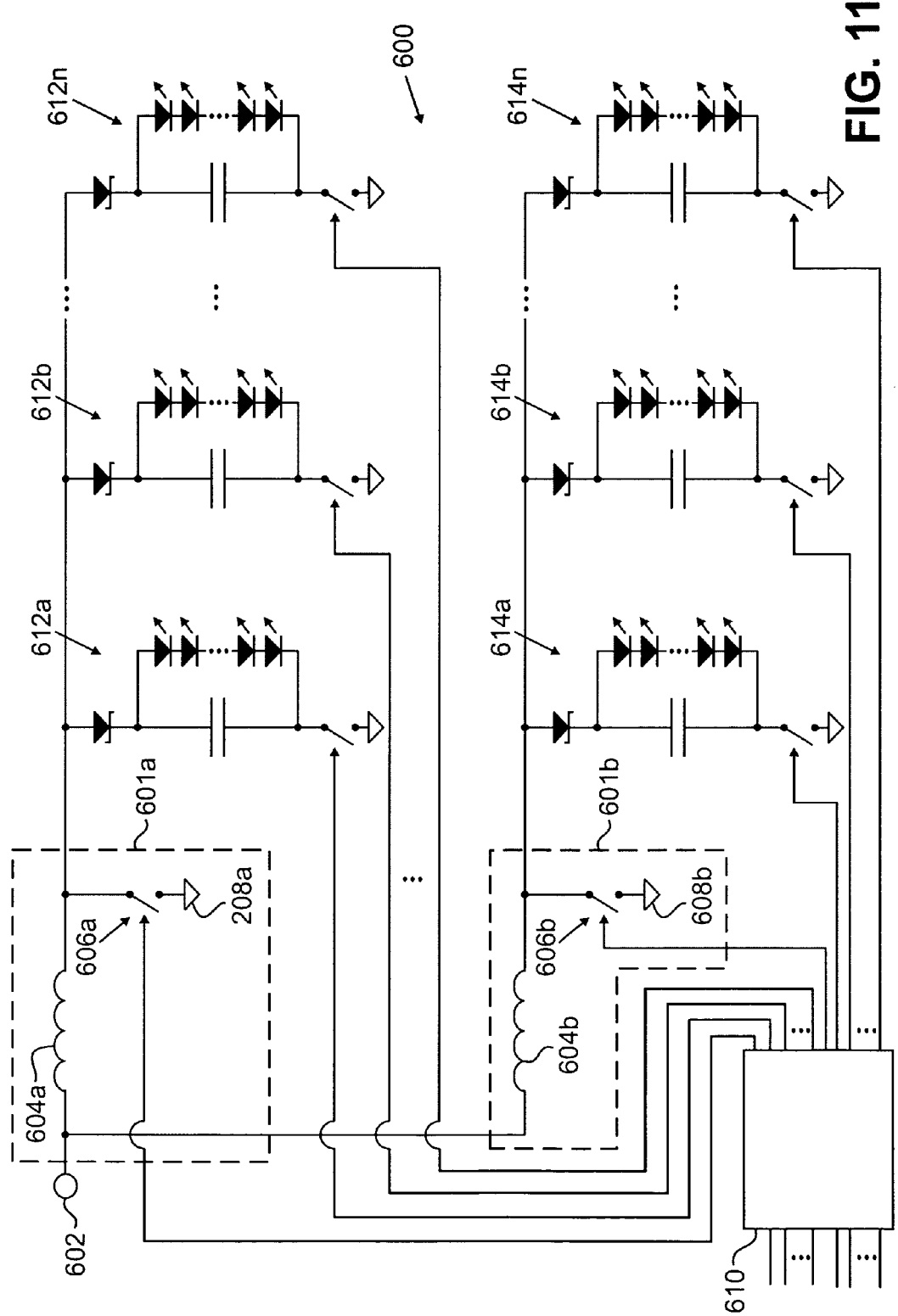
FIG. 11 is a circuit schematic of a boost mode multiple inductor multiple output power supply.

FIG. 11 illustrates circuit 600, in which a single controller is operable to control multiple power supplies. Circuit 600 has voltage input 602 connected to inductors 604a and 604b. For exemplary purposes, current supply subcomponents 601a and 601b are configured in a boost mode with main switches 606a and 606b connected to ground contacts 608a and 608b. Any suitable current supply including those already described, following, or a combination thereof, may be used. Controller 610 handles switching operation for both main switches 606a and 606b and all output channels 612a-612n and 614a-614n.

The current supply subcomponent can be constructed using any of the above topologies or any other suitable topology to accommodate the operation of the output channels and if applicable, the freewheel switch. In different embodiments, the location of the channel switches and the potential to which the output channels are referenced may change. The potential requirement for the freewheel switch may also change.

Channel Control

Prior SIMO power supplies focus on providing a fixed regulated voltage for loads with a variable current. Other types of loads, such as LEDs, require a regulated current and have a variable voltage drop. For the application of voltage regulation, the power supply must respond to a transient current at the load with good cross regulation characteristics. Cross regulation is the error in the voltage regulation on a channel that has a static load current when a different channel has had a change in its load current. For the application of a LED load there are no transient events at the load and the LED voltage changes between devices and with temperature. However, the power supply must be capable of independently regulating the current through each channel based on a control signal and/or independently turning on and off (enabling and disabling) channels to dim the LEDs through external PWM input command signals.

Figure 12:
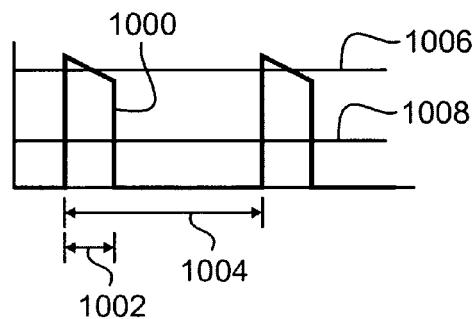
FIG. 12 is a timing diagram illustrating output current regulation.

The plurality of output channels are operated in a sequence. As a result, no one channel is driven constantly. FIG. 12 illustrates an exemplary current waveform 1000 for one channel in a boost configuration circuit similar to that described in FIG. 1. The channel is on for a period $T_n$ (1002) out of a channel period $1/F_{CH}$ (1004). When on, the channel current is equal to $I_L$ (1006), the inductor current. Because this current is only seen for a fraction of the channel period, the average on state current, Ion, (1008) over the period is less.

$$Ion = T_n * F_{CH} * I_L \quad \text{(Equation 1)}$$

From Equation 1, it can be realized that the average output current Ion is proportional to the duty cycle ($T_n*F_{CH}$) and the inductor current $I_L$. The duty cycle can be adjusted by either changing the on time ($T_n$) or the channel frequency ($F_{CH}$).

Figure 13A:
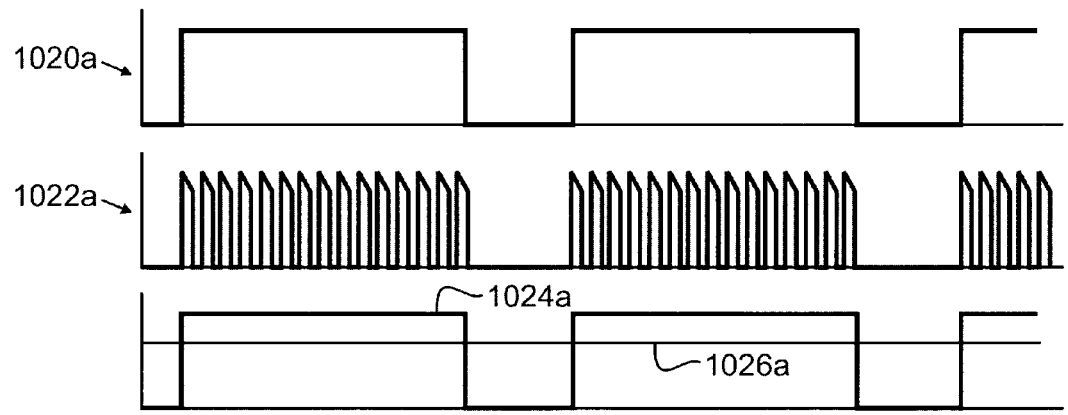
FIG. 13a is a timing diagram illustrating dimming control utilizing current regulation and pulse width modulation at a 75% duty cycle.
Figure 13B:
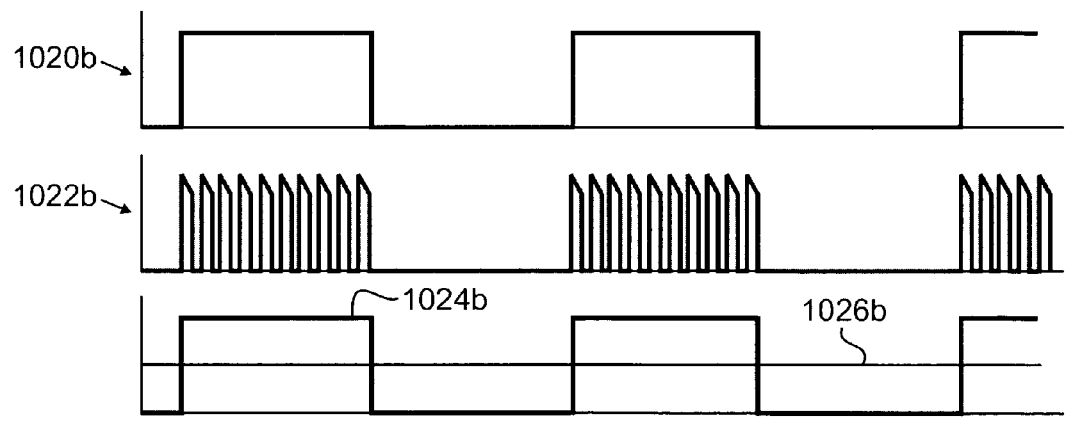
FIG. 13b is a timing diagram illustrating dimming control utilizing current regulation and pulse width modulation at a 50% duty cycle.

In the majority of applications for LED drivers, the LED is turned on by regulating the current of the LED to a fixed value. Different intensities of light are realized with pulse width modulation (PWM) of the LED current which is sometimes referred to as dimming the LED. Pulse width modulation turns the LED on and off at a fixed frequency (Fpwm) and achieves different intensities of light by varying the on time. The ratio of the on time over the period (1/Fpwm) is the duty cycle and is directly proportional to the light intensity. For example, FIG. 13a is a graph illustrating an LED current waveform having a 75% duty cycle and FIG. 13b is a graph illustrating an LED current waveform having a 50% duty cycle. Generally, the PWM dimming frequency (Fpwm) is at a much lower frequency than the channel frequency ($F_{CH}$) but still high enough that the switching is not visible to the eye. PWM commands 1020a and 1020b are the command signals input to the controller. Channel currents 1022a and 1022b are the actual currents supplied to the parallel combination of the capacitor and LEDs forming the output channel. The current through this parallel combination is not constant due to the channel switching but the capacitor maintains a DC current through the LEDs with a small current ripple component.

FIG. 13a is a waveform diagram illustrating a case in which the channel is activated and the channel current pulses are then present for 75% of the PWM dimming period. The remaining 25% of the time, the channel is disabled and the LEDs are off. FIG. 13b shows a similar waveform diagram except that the PWM duty cycle is 50% so the channel current pulses are present for 50% of the PWM dimming period. Over a period of time, this can be approximated as a square wave with amplitude Ion (1024a and 1024b). The light output of the LEDs is directly related to the square wave of the current, and the human eye integrates that square wave resulting in a constant perceived light output with perceived brightness proportional to the average current of 1026a and 1026b. With a 75% duty cycle, the average supplied current 1026a and corresponding perceived brightness is 75% of the fully on current. Similarly, the average supplied current 1026b for a 50% duty cycle is approximately 50% the perceived brightness of the fully on current. By varying the duty cycle, the perceived brightness of the LED can be altered, effectuating LED dimming control.

Figure 14:
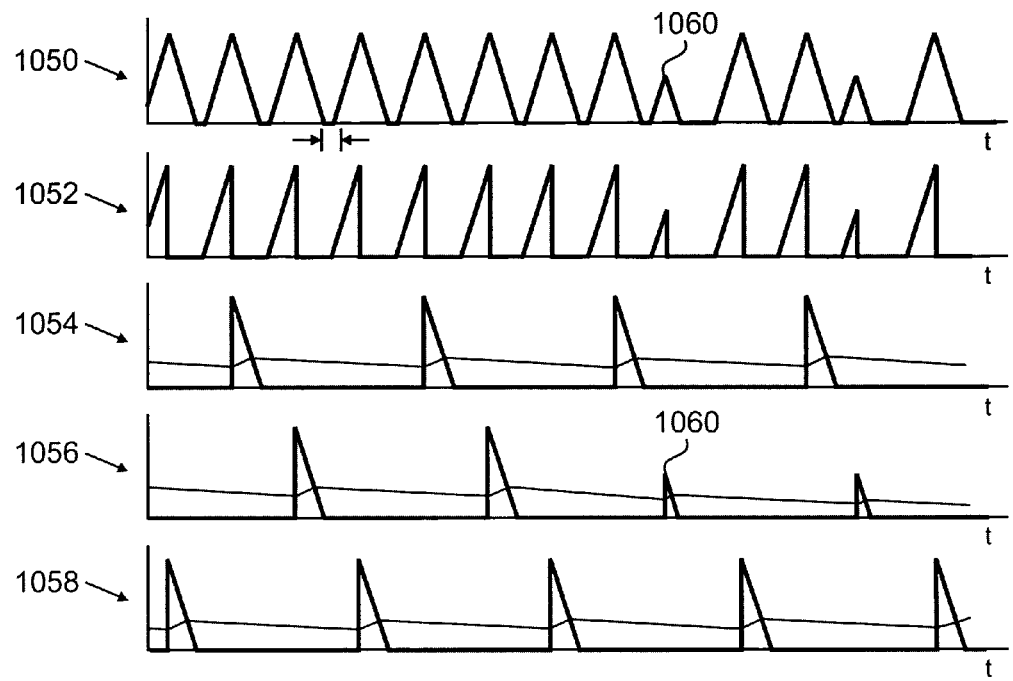
FIG. 14 is a timing diagram illustrating dimming control using a analog dimming method.

FIG. 14 is a waveform diagram illustrating an "alternate method" of controlling the perceived brightness of the LED using discontinuous conduction. In this example, three channels are independently regulated by sequencing through the channels each period (explained in more detail later). Main inductor current waveform 1050 is split into charging waveform portion 1052 and channel output waveform portions 1054, 1056, and 1058. Rather than enabling and disabling a channel as is done using the PWM method to decrease the light intensity, all of the current pulses associated with a channel are reduced in amplitude. This is referred to as analog dimming. At point 1060, the output of the second channel is reduced, in response to an external input by modulation the reference of the regulation loop associated with the second channel, and remains at that magnitude for its subsequent pulses to maintain a reduced average output current. This is in contrast to the PWM method where the average current is controlled by changing the duty cycle of a substantially fixed current pulse.

For the analog dimming technique, the regulated current is modulated to adjust the light intensity. The light intensity of an LED is directly proportional to its forward current, but the color point of the LED can also be slightly impacted by the forward current. Therefore, while analog dimming does adjust the intensity, it also impacts the color of the LED, whereas PWM dimming does not impact the color point since it keeps LED forward current constant. However, analog dimming is typically less complicated to implement than PWM dimming since it can be realized by modulating the reference of the control loop. Analog dimming is best suited for lower cost systems that do not require an accurate color point. Similar to PWM dimming, analog dimming is typically controlled by an external signal that sets the magnitude, this is most often a DC voltage that is proportional to the desired magnitude. Other interface methods can be used, both analog and digital, to control analog dimming as well as PWM dimming.

In general, the controller monitors channel control signals that may be of a variety of types (a PWM command, a digital serial interface, an analog input interface, a digital input interface, etc) to determine a desired state of each of the output channels. It then determines if a channel has an enabled state which requires power, calculates the required pulse to supply that power and causes the inductor to be discharged to the channel appropriately. For analog dimming the required power is determined based on an external input. The following techniques can be used.

Continuous Conduction Mode (CCM)

An important aspect of a multiple output LED supply is that when one channel is disabled (or enabled) by a PWM dimming operation, other channels are minimally affected. This is similar to the cross regulation issue addressed with respect to voltage based SIMO supplies, but it is more dramatic and is initiated by a separate input (the PWM command input) to the controller rather than by the load itself. Similarly, for analog dimming the regulation point of one channel must be changed with minimal impact to the other channel. Also, unlike voltage regulation this change is initiated by a external control signal.

There are many possible methods to control the switch timing in an SIMO power supply. Generally, continuous conduction mode (CCM) is the most efficient method for higher current loads due to lower peak current (Ipk) that result from a lower inductor current ripple ($\Delta I_L$). However, disabling a channel without impacting the other channels is difficult in this configuration since there are only two states for the switches which can cause the channels to become unregulated without the presence of a freewheel switch or complex control system.

Figure 15:
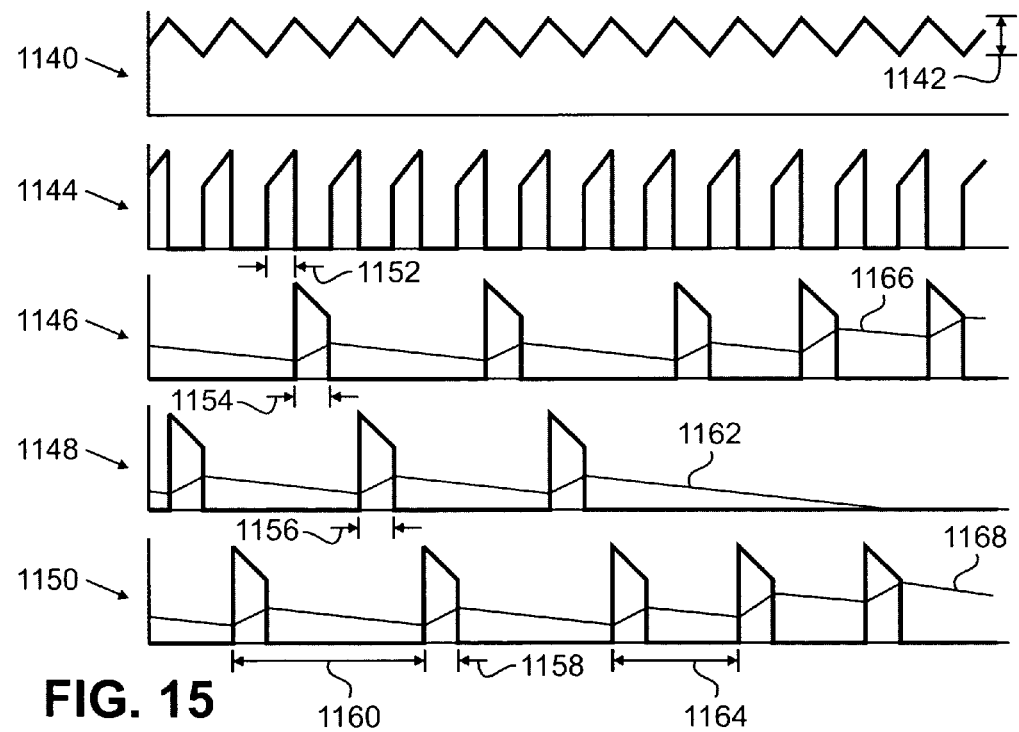
FIG. 15 is a timing diagram illustrating dimming utilizing CCM control without a freewheel switch.

FIG. 15 is a waveform diagram illustrating what will happen with a basic control system when a channel is instantaneously disabled. Inductor current 1140 increases and decreases periodically. It increases when the main switch (e.g. 16 in FIG. 1) is closed to charge the inductor, and it decreases when the main switch is open and the channel switches (e.g. 20a-20n in FIG. 1) are closed charging each output channel. The magnitude of the inductor current ripple 1142 is referred to as $\Delta I_L$. The charging waveform portion of inductor current $I_L$ is shown by 1144 and three output channels are shown by output waveform portions 1146, 1148, and 1150. In this arrangement, a main switch is closed to charge the inductor for a main switch subinterval (e.g. 1152) followed by a first channel switch interval (e.g. 1154), a main switch subinterval, the next channel switch interval (e.g. 1156), a main switch subinterval, and then the third channel switch interval (e.g. 1158). The power supply rotates through the three output channels charging the inductor in between each channel yielding a full cycle period (e.g. 1160) consisting of one charge and discharge cycle for each channel.

Disabling a channel is difficult in this configuration because there are only two states for the switches. One state is to turn on the main switch which will charge the inductor. The other state is to turn off the main switch and turn on one of the channel switches which discharges the inductor into the corresponding load. The simplest method to disable a channel is to remove it from the channel sequence. For example, if channel two were to be disabled, its average current 1162 would go to zero. The full cycle period 1164 is now shorter because there are only two remaining channels. As a result, each channel is charged more frequently and channel one current 1166 and channel three current 1168 begin to increase because their duty cycle has increased and disturbed regulation.

The on time of the main switch and the channel switches is governed by the input voltage and the voltage across the LED strings. The inductor current must therefore be reduced to keep the remaining channels in regulation when a channel is disabled. Since the inductor current is governed by V/L=di/dt this cannot be done instantaneously in a circuit with two switch options where the inductor current does not return to zero as in this example. Something must be done to accommodate this additional subinterval caused by the disabled channel, and the impact of enabling channel as well. In addition, each channel must be independently regulated without impact to the other channels to realize dimming. Embodiments of the present invention which address these issues include discontinuous conduction mode and the use of a freewheel switch. Without these techniques disabling, enabling, or a change in regulation cannot be performed instantaneously due to the two switch states and the governing equation V/L=di/dt.

Discontinuous Conduction Mode (DCM)

Figure 16:
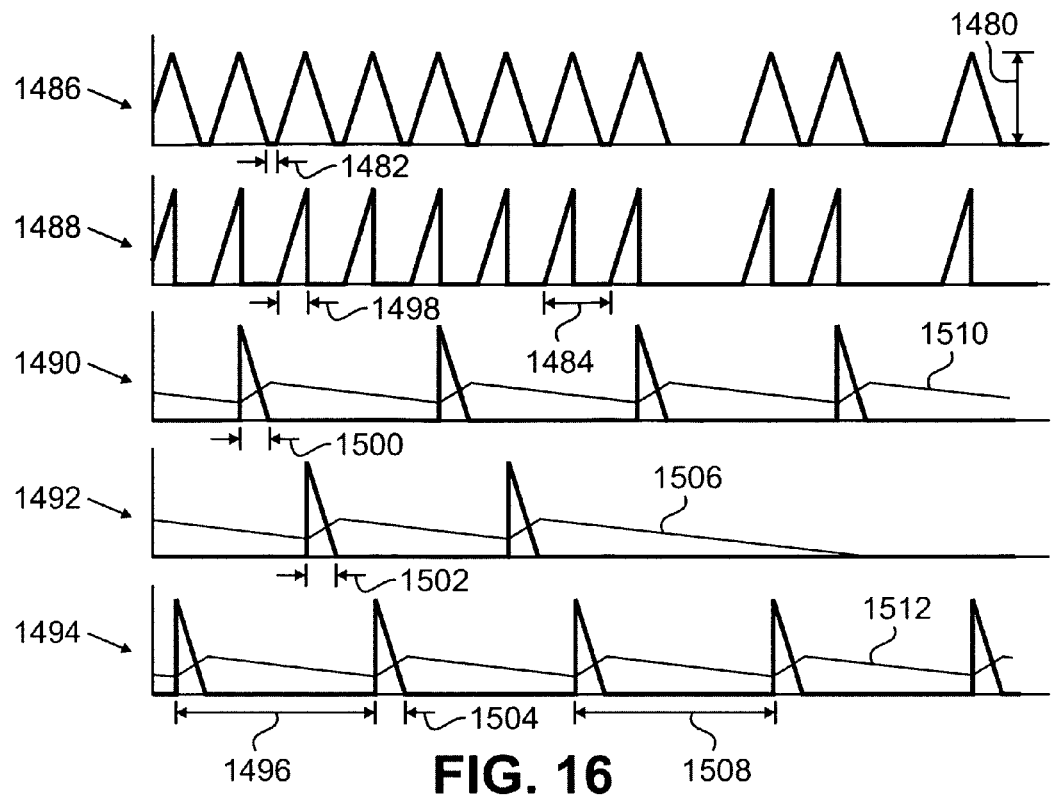
FIG. 16 is a timing diagram illustrating the DCM "alternating method."

One method to make the channels of a multiple output power supply independent is to operate in discontinuous conduction mode (DCM) which will reset the inductor current $I_L$ to zero at the end of each cycle as illustrated in the waveform diagram of FIG. 16. The method shown in FIG. 16 is described as a DCM "alternating method". All of the described circuits (such as circuits 10, 50, 250, 300, 350, 400, 450, and 600 shown in FIGS. 1, 2, 5, 6, 7, 8, 9, 10, and 11 respectively) are suitable for DCM operation. FIGS. 5, 6, 8, and 9 are illustrated with a freewheel switch but this additional switch is not required for DCM operation, and can be simply removed from the circuit. Since inductor current ripple 1480 is inversely proportional to the inductance, DCM is achieved by selecting an inductor that has a value small enough to allow $I_L$ to return to zero for a zero subinterval (e.g. 1482) before the end of a channel cycle interval (e.g. 1484). Once the inductor current returns to zero, the diodes turn off and prevent the inductor current from continuing negative, which can also be realized with a synchronous rectifier under proper control. This mode of operation provides an additional idle period can be used to keep a constant channel frequency without impacting the inductor current or any of the output channel currents. This idle period is referred to as the zero current subinterval. In CCM the only two options were to charge the inductor current or discharge the inductor current through one of the output channel currents. The addition of the zero current subinterval allows the output channels to remain completely independent.

Returning to FIG. 16, inductor current 1486 is split into charging waveform portion 1488 and channel output waveform portions 1490, 1492, and 1494. One full cycle interval (e.g. 1496) contains a main switch subinterval (e.g. 1498), a first channel switch subinterval 1500, a main switch subinterval, a second channel switch subinterval 1502, a main switch subinterval, and a third channel switch subinterval 1504. When channel two is disabled, its average current 1506 goes to zero. $I_L$ returns to zero after each switching period and remains there for the main switch interval and the second channel switch subinterval because channel two has been disabled. This keeps full cycle period 1508 equal to that of 1496 and constant across all cycles. Channel one current 1510 and channel three current 1512 are unaffected by the disabling of channel two. Using this method, the channel frequency remains constant and the inductor current $I_L$ always starts at the same value.

Referring back to Equation 1, $Ion=T_n*F_{CH}*I_L$, for the DCM "alternating method," the channel frequency ($F_{CH}$, inverse of the period of the full cycle interval) remains constant, and the on time ($T_n$) is determined by the inductor current ($I_L$). Therefore the channel current can be regulated by controlling the inductor current ($I_L$), which for the boost mode converter (e.g. FIG. 1) is controlled by adjusting the on time of the main switch (e.g. 16). Since each channel cycle interval (e.g. 1484 of FIG. 16) begins and ends with zero current subinterval (e.g. 1482) the inductor current ($I_L$) can be adjusted without impacting a different channel. This in turn means that when any channel is disabled or enabled, there is no impact to regulation of the other output channels, as previously described with FIG. 16. In addition to enabling or disabling selected channels, the regulated current for any channel can also be independently modified with no impact to the other channels, to realize analog dimming as shown in FIG. 14.

Figure 17:
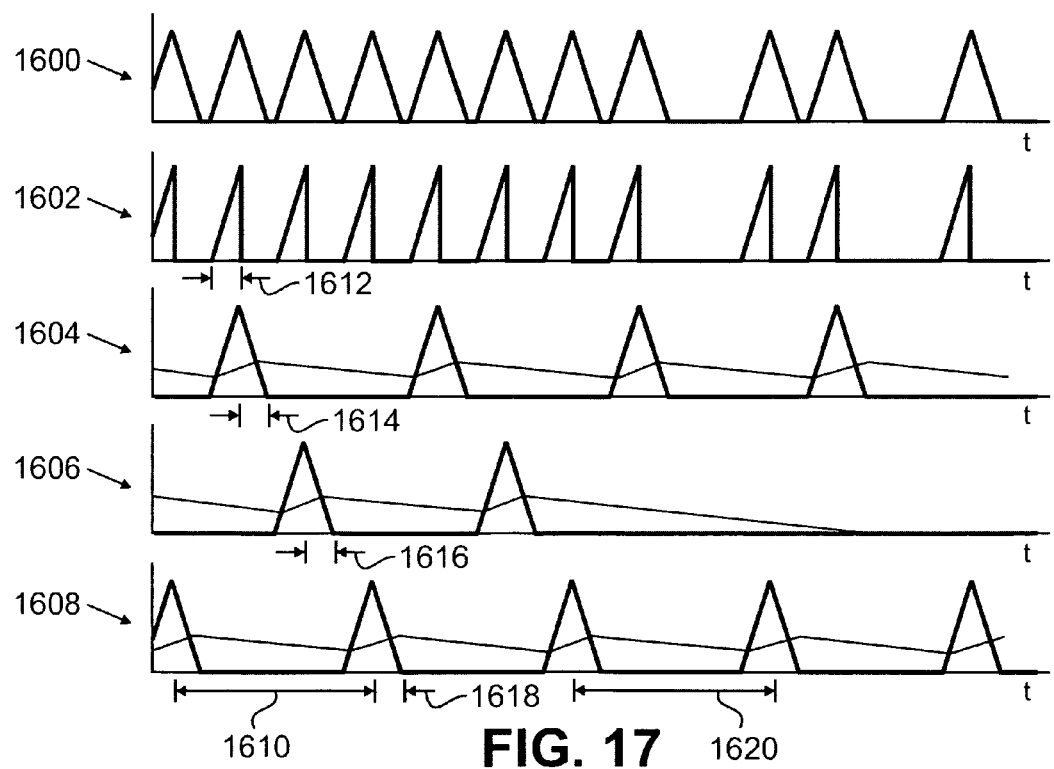
FIG. 17 is a timing diagram illustrating the DCM "alternating method" with a buck topology circuit.

The DCM "alternating method" was demonstrated for a boost mode SIMO power supply in FIG. 16, but this method can be applied in a similar fashion to any other SIMO power supply. One such alternate application of the DCM "alternating method" is demonstrated in the waveform diagram of FIG. 17 for the buck mode SIMO power supply shown in FIG. 7. Inductor current 1600 is split into charging waveform portion 1602 and channel output waveform portions 1604, 1606, and 1608. In this case, the energy is delivered to the load during both the discharge and charge portions of the inductor current as shown by channel output waveform portions 1604, 1606, and 1608. One full cycle interval (e.g. 1610) contains a main switch subinterval (e.g. 1612), a first channel switch subinterval 1614, a main switch subinterval, a second channel switch subinterval 1616, a main switch subinterval, and a third channel switch subinterval 1618. The operation remains the same when channel two is disabled, the current remains at zero during the disabled interval keeping the full cycle period 1620 constant across all cycles.

Figure 18:
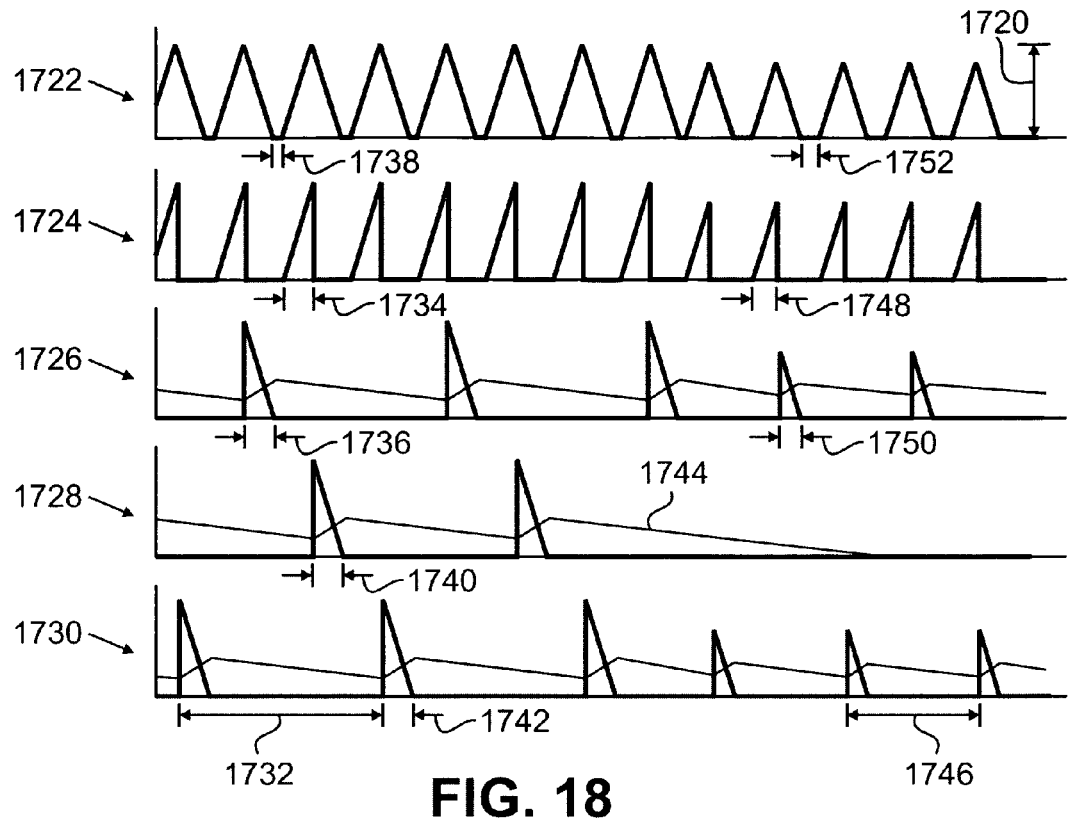
FIG. 18 is a timing diagram illustrating the DCM "skip channel alternating method."

It is not necessary for the power supply to remain essentially idle during a main switch interval correlated with a disabled channel. FIG. 18 is a waveform diagram illustrating an embodiment of a DCM "skip channel alternating method". Rather filling the disabled channel time interval with a zero current subinterval, the disabled channel is removed from the sequence and the inductor current is adjusted to a new magnitude to compensate for the change in the period of the full cycle interval ($1/F_{CH}$). Inductor current ripple 1720 is the same magnitude as it was in FIG. 16 (1480) when all 3 channels are operating but is instantaneously reduced when a channel is disabled to maintain the average current in the remaining channels. Inductor current 1722 is split into charging waveform portion 1724 and channel output waveform portions 1726, 1728, and 1730. Full cycle interval 1732 has a main switch subinterval (e.g. 1734) followed by first channel switch subinterval 1736 and zero subinterval 1738. A similar process of charging the inductor in a main switch interval and discharging it to an output channel is completed for channel switch subintervals 1740 and 1742. When channel two is disabled and its average current 1744 goes to zero, the period of the full cycle interval is shortened (e.g. 1746). The main switch subinterval is shortened (e.g. 1748) to reflect the reduced demand from the output channels due to more frequent charging. As a result the first channel switch subinterval 1750 is shorter resulting in less charge delivered per cycle and keeping the average current constant by balancing Equation 1. Such an arrangement reduces the losses associated with high peak currents, and helps keep the frequency content more consistent.

There are several methods that may be used to instantaneously change the inductor current ripple and maintain the average steady state current of the channels when a channel is removed or added to the sequence. The average current is determined by the channel on time ($T_n$), inductor current ($I_L$), and the channel frequency ($F_{CH}$), according to Equation 1 ($Ion=T_n*F_{CH}*I_L$). The remaining parameters can be adjusted to maintain the average current when the channel frequency changes. The mathematical relationship can be used to adjust the control loop to achieve the instantaneous change required for the inductor current. The control loop, by itself, is often bandwidth limited and will take several cycles to achieve the appropriate operating point when a channel has been added or removed.

Two major control schemes that are used to regulate a switch mode power supply are voltage-mode control and current-mode control. For voltage-mode control, a duty cycle is controlled to regulate the output. Therefore, when a channel is removed or added to the sequence the duty cycle must change to accommodate the change in the channel frequency.

$$D(N) = K\frac{1}{\sqrt{N}} \quad \text{(Equation 2)}$$

Equation 2 shows that the duty cycle (D) is inversely proportional to the square root of the number of channels that are enabled (N), for DCM operation. The control loop determines the constant K which is a function of the power supply topology and its operating point. Given the mathematical relationship, a gain, reference, threshold, or some other parameter that determines the duty cycle, can be adjusted based on the number of channels that are enabled. This adjustment does not need to be exact since the control loop will correct for any error after the adjustment is made. Therefore, the relationship defined by Equation 2 can be linearized to reduce implementation complexity.

For current-mode control, the output is regulated by controlling the peak inductor current (or an analogous parameter). Therefore, the peak current should be adjusted when a channel is removed or added to the sequence to maintain the average current in the remaining channels. The peak inductor current ($I_{PK}$) is proportional to the square root of the number of channels that are enabled (N), for DCM operation, as described by Equation 3. Thus, a parameter that determines the peak current, such as a gain, reference, or threshold, can be adjusted according to the mathematical relationship to minimize the disturbance of removing or adding channels. Similar to voltage-mode control, the adjustment does not need to be precise as the control loop drives the constant K to minimize the error at the output.

$$I_{PK}(N) = K\sqrt{N} \quad \text{(Equation 3)}$$

Other control techniques outside the described voltage-mode and current-mode control are possible and will be recognized by those skilled in the art in light of these concepts.

Figure 19:
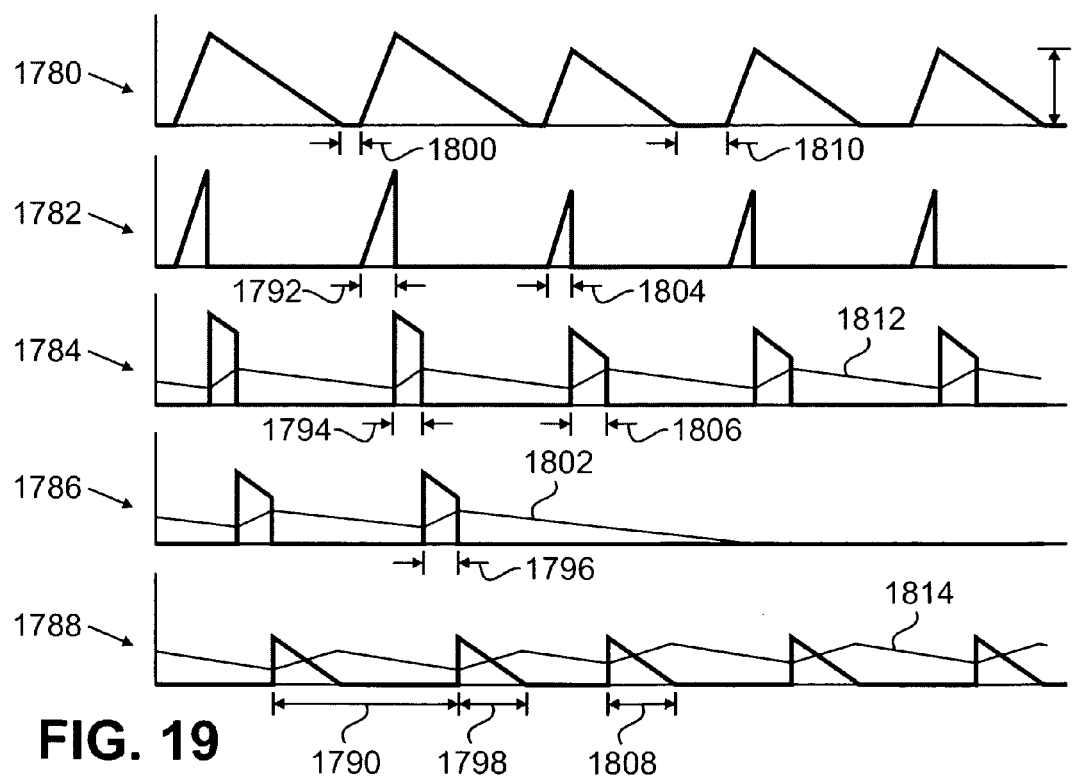
FIG. 19 is a timing diagram illustrating the DCM "multiplexing method."

FIG. 19 illustrates an alternate embodiment utilizing a DCM "multiplexing method" where the inductor is charged only once per full cycle interval. Inductor current 1780 is split into charging waveform portion 1782 and channel output waveform portions 1784, 1786, and 1788. A full cycle interval (e.g. 1790) begins with main switch subinterval 1792 which is followed by first channel switch subinterval 1794, second channel switch subinterval 1796, third channel switch subinterval 1798, and zero subinterval (e.g. 1800). Because the inductor current $I_L$ is different for each channel, each channel switch interval will be different even if each channel requires the same total charge. The period of the channel switch interval is calculated such that the total current supplied (the integral of the current waveform shown) meets the demand for that channel during the period.

When channel two is disabled and its average current 1802 goes to zero, the full cycle period is not changed but the main switch subinterval, channel switch intervals, and zero subinterval are affected. The main switch subinterval (e.g. 1804) is shortened such that the total charge to the inductor reflects the sum of the channel demands with channel two disabled. The first channel switch interval (e.g. 1806) is lengthened because the peak inductor current was reduced. The total charge supplied to channel one remains the same as the integral of the previous period with a higher inductor current and the new period with the lower inductor current are the same. Since the inductor current still returns to zero during the third channel switch interval (e.g. 1808) third channel sub interval remains the same, while the zero sub interval (e.g. 1810) is lengthened to consume the remainder of the full cycle interval. In this way, first channel current 1812 an third channel current 1814 maintain the same average current after channel two is disabled.

The described DCM "multiplexing method" can also be used to independently regulate the current in each channel, allowing analog dimming to be realized. Instead of removing or adding a channel to the sequence, the inductor current ($I_L$) and the on time ($T_n$) of each channel, from Equation 1, can be controlled to independently regulate the current in each channel without impact to the full cycle interval or the other channels.

In addition to the performance improvement of enabling and disabling individual channels, DCM also allows all of the channels to be a disabled simultaneously. With CCM, the output channels had to be used to discharge the inductor current, and thus all channels could not be disabled until the inductor current is fully discharged, but with DCM, the disabling of all channels can be done instantaneously since the inductor current is reset to zero at the end of each cycle.

Continuous Conduction Mode (CCM) with Freewheel Switch

The first CCM example demonstrated the difficulty in maintaining a constant average current across all channels when disabling a channel. In CCM, the inductor current is not returned to zero between cycle periods. It is possible to provide good cross regulation characteristics in a CCM circuit by including a freewheel circuit. The freewheel circuit allows the inductor current to be maintained (such as in FIGS. 3, 5, 6, 8, and 9) or gradually changed (as in FIG. 4) when there is charge left in the inductor and no output channels currently require charging. The freewheel switch forces the voltage across the inductor to zero (since V/L=di/dt) and holds the present state of the inductor current. The freewheel switch may also force a non-zero voltage across the inductor (as in FIG. 4), causing the inductor to gradually decrease or increase, which still provides an additional state that does not aggressively charge the inductor or discharge the inductor into any of the output channels. The freewheel switch may be implemented with multiple switches (such as in FIG. 8) in some embodiments.

Figure 20:
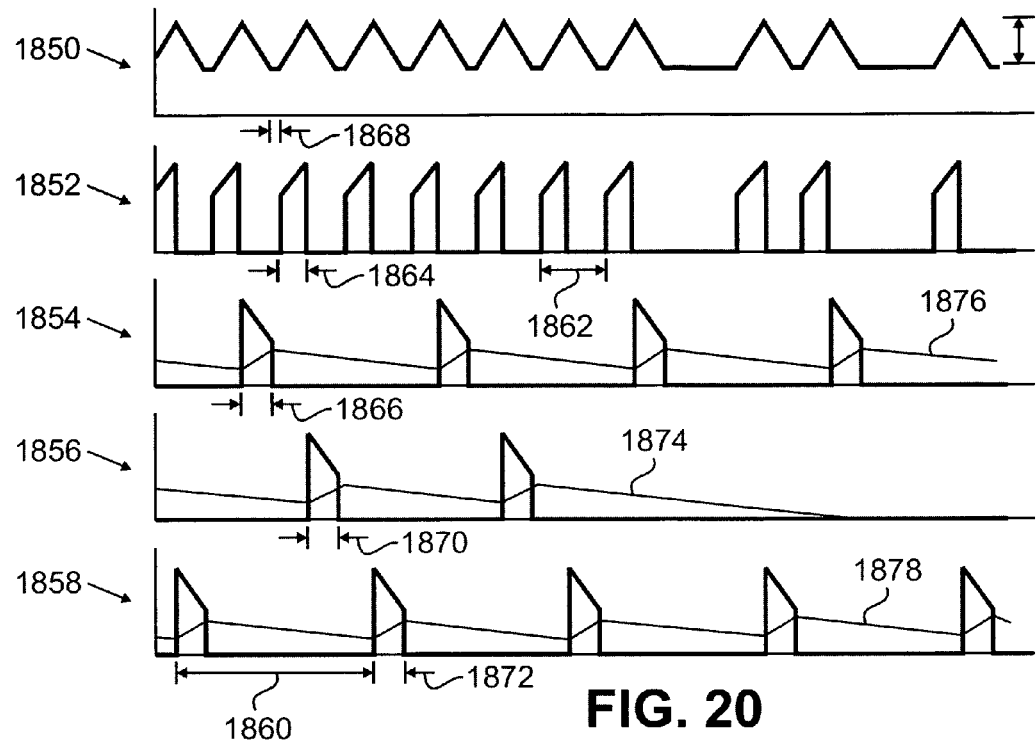
FIG. 20 is a timing diagram illustrating dimming utilizing the CCM "alternating method" and a freewheel switch.

FIG. 20 illustrates a CCM "alternating method" that includes a freewheel subinterval. Inductor current 1850 is split into charging portion 1852 and channel output waveform portions 1854, 1856, and 1858. Full cycle interval 1860 has three iterations of exemplary channel subinterval 1862; one is associated with each output channel. Each channel subinterval begins with a main switch subinterval (e.g. 1864) followed by a channel switch subinterval (e.g. 1866) and freewheel subinterval (e.g. 1868). During the freewheel subinterval, the freewheel switch is activated to preserve inductor current and prevent discharging the inductor current into any of the output channels. The process is repeated for the second channel (channel switch subinterval 1870) and the third channel (channel switch subinterval 1872) to complete full cycle interval 1860.

Independent regulation is further explained when the second channel is disabled and its average current 1874 goes to zero. The freewheel subinterval is extended through the channel interval associated with the second channel such that channel one current 1876 and channel three current 1878 remain unchanged. This mode of operation is similar to DCM but at a nonzero current and can be referred to as pseudo continuous conduction mode (PCCM). Similar to DCM, the freewheel switch allows the period to be extended to keep a constant channel frequency without impacting the inductor current or the regulation of channel currents.

The freewheel subinterval is proportional to the inductor current $I_L$. Therefore, $I_L$ must be large enough such that the channel switch subinterval does not consume the entire channel subinterval (e.g. 1862) as this could cause the output channel currents to become unregulated. Referring to Equation 1, Ion=$T_n*F_{CH}*I_L$, with the existence of the freewheel subinterval the inductor current ($I_L$) and the channel frequency ($F_{CH}$, inverse of the period of full cycle interval 1860) can remain constant while the period of the channel switch subinterval ($T_n$, e.g. 1866, 1870, 1872) can be used to independently regulate each channel's current (Ion). This independent regulation allows both PWM and analog dimming to be realized. However, a long freewheel subinterval is an efficiency loss since it results in an excessive peak inductor current. Thus the inductor current can be regulated based on the freewheel period to optimize the efficiency.

The "skip channel alternating method" described for DCM (e.g. FIG. 18) can also be applied to PCCM with a freewheel switch. Analogous to DCM, channels can be removed or added to the sequence by adjusting the peak inductor current to account for change in current demand. As opposed to filling the disable channel time interval with a freewheel subinterval (e.g. 1868), which as previously stated will result in a lower efficiency. The freewheel subinterval can be used to help transition the peak inductor current between different current demands as channels are enabled or disabled, or the regulation point is changed based off a external input.

The same techniques used to instantaneously change the inductor current for DCM control can also be applied to PCCM. However, because the mode of operation is different, the mathematical relationships change. For the "skip channel alternating method" using PCCM, the average inductor current ($I_{L\_AVE}$) is changed as channels are added and removed from the sequence. However, this change cannot occur instantaneously because the inductor current is governed by V/L=di/dt. It may take the inductor current a few cycles to reach the appropriate value. Using a mathematical relationship, the control loop can be quickly adapted to the appropriate value allowing the correct operating point to be achieved more rapidly. For PCCM, the average inductor current ($I_{L\_AVE}$) is proportional to the number of channels enabled (N) as described by Equation 4. This applies to a current-mode control scheme because the peak inductor current is directly related to the average inductor current. Similar to DCM, the relationship only needs to be approximate as any error will be corrected by the control loop.

$$I_{L\_AVE}(N)=K \cdot N \quad \text{(Equation 4)}$$

Figure 21:
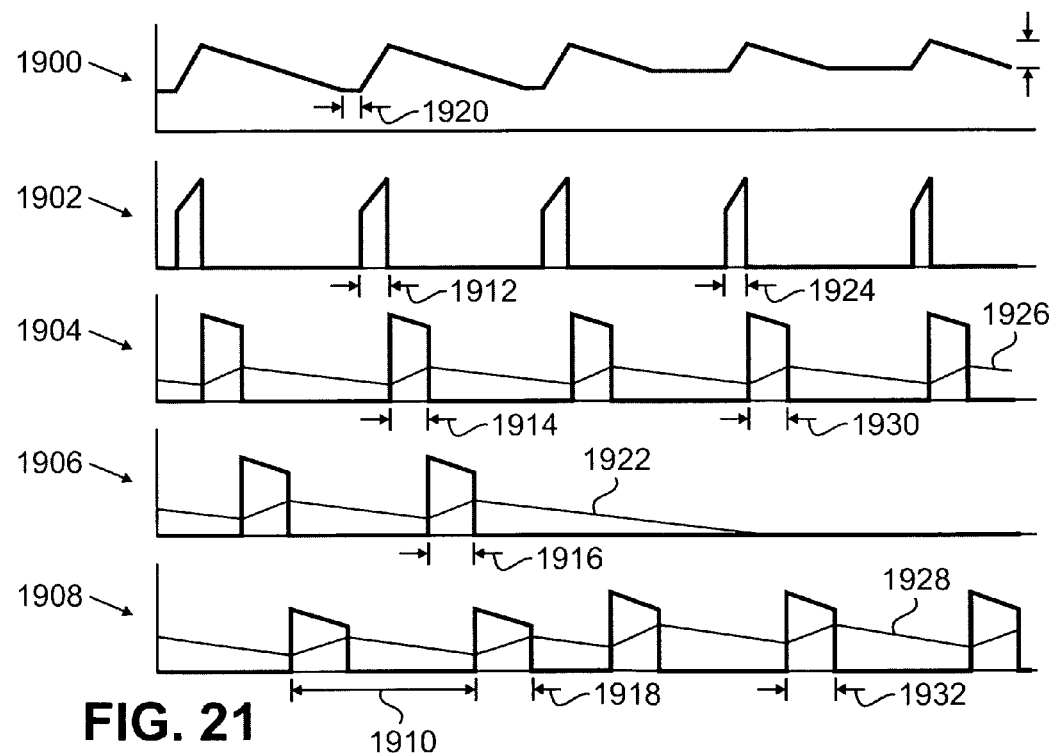
FIG. 21 is a timing diagram illustrating dimming utilizing the CCM "multiplexing method" and a freewheel switch.

The freewheel switch can also be used in a "multiplexing method" where there is only one inductor charging interval for each full cycle interval as shown in FIG. 21. Inductor current 1900 is split into charging waveform portion 1902 and channel output waveform portions 1904, 1906, and 1908. A full cycle interval (e.g. 1910) begins with main switch subinterval 1912 followed by channel switch subintervals 1914, 1916, and 1918. A freewheel subinterval (e.g. 1920) completes full cycle interval (e.g. 1910).

When channel two is disabled and its average current 1922 goes to zero, the main switch subinterval is shortened (e.g. 1924) due to the reduced current demand. Because the peak inductor current is unchanged, the channel switch subinterval remains the same for channel one (e.g. 1930). The third channel is moved up in the sequence and therefore its channel switch interval is reduced (e.g. 1932) to account for the increased inductor current. To keep the channel frequency ($F_{CH}$) constant, the freewheel switch interval is also extended to compensate for the missing channel. As described for the "alternating method" the freewheel switch interval can also be reduced, to optimize efficiency, for the "multiplexing method" by regulating the peak inductor current. Though some correlation between the channels is induced, the average current (e.g. 1926 and 1928) for each output channel is maintained. Similar to the other methods the "multiplexing method" can be used to realize both PWM and analog dimming.

This arrangement offers the same improvement as the DCM method over the non-freewheel CCM method when all channels are disabled simultaneously. With CCM, the output channels had to be used to discharge the inductor current, but with the freewheel switch, the inductor current can be stored for use when the channels are re-enabled.

Thus far, the freewheel subinterval has been shown as ideal and lossless. This is not essential. The slope on the inductor current $I_L$ does not have to be zero during the freewheel subinterval, it can be slightly discharged or charged. For example, the circuit illustrated in FIGS. 3, 5, 6, 8, and 9 will exhibit slight discharging due to loss elements. The freewheel subinterval can also be realized with an additional channel that is not connected to an output but is simply used to force a voltage across the inductor such as that shown in FIG. 4. This technique can be applied to any circuit topology. The distinction is that during the freewheel subinterval, no inductor current is delivered to any channel and the inductor current is not dramatically increased. The potential across the inductor should be lower than the input voltage. An implementation that discharges is preferable because the change can be compensated for with the main switch subinterval.

Though described with three output channels for simplicity, all of the foregoing is applicable to multiple output power supplies with any number of outputs. Further, the present invention can be applied to any type of load with any number of outputs. The load can require any type of regulation including current, voltage, power, light intensity, light color, or other parameters. The controller has been described as responding to discrete channel enable inputs to selectively enable and disable the output channels for functions such as PWM dimming and analog dimming. These command signals are not required to be discrete inputs, but rather could also be provided externally from any type of interface. Other possible interfaces include analog input signals and digital serial interfaces such as $I^2C$. They may also be generated internally based on a fixed or programmed duty cycle or in response to software loaded in the controller. Output channels can be enabled and disabled singly, in groups, or as a whole. Alternating and multiplexing methods have been described, but any of a number of sequencing techniques are applicable including a combination of the alternating and multiplexing methods. Switching frequencies do not need to remain constant and can be adjusted to reduce the zero current subinterval or freewheel subinterval to achieve higher efficiencies. Although illustrative embodiments describe the use of an inductor, any storage element capable of storing energy may be used.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for supplying energy to multiple output channels, the method comprising:
   storing energy from an energy source in a storage element of a current supplying circuit;
   monitoring a plurality of channel control signals to determine a state for each of the output channels where each channel control signal is associated with one of the multiple output channels; and
   operating a plurality of channel switches, each associated with one of the multiple output channels, to direct a current from the energy stored in the storage element from a common node to the output channels which have states that require energy one output channel at a time.

2. The method of claim 1 further comprising storing energy from the energy source in the storage element while directing the current from the energy stored in the storage element to one of the output channels that has a state that requires energy.

3. The method of claim 2 wherein directing the current from the energy stored in the storage element to the output channel comprises directing a controlled current to the output channel based on the state of the channel control signal associated with the output channel.

4. The method of claim 2 wherein the storage element is an inductor.

5. The method of claim 4 wherein directing the current from the energy stored in the inductor comprises using a power supply topology selected from the group consisting of: a boost mode single inductor multiple output (SIMO) power supply, a flyback SIMO power supply, a forward SIMO power supply, buck SIMO power supply, a buck-boost SIMO power supply, and a single ended primary inductor converter (SEPIC).

6. The method of claim 1 wherein monitoring the plurality of channel control signals includes monitoring a plurality of channel enable signals to determine if an output channel requires energy, where each channel enable signal is associated with one of the multiple output channels.

7. The method of claim 1 wherein monitoring a plurality of channel control signals includes monitoring a plurality of analog dimming magnitude inputs.

8. The method of claim 1 wherein monitoring the plurality of channel control signals includes a method of monitoring a channel control signal selected from the group consisting of: reading a digital serial interface, reading a pulse width modulation interface, reading a digital input interface, reading an analog input interface, and reading commands from a preprogrammed internal controller.

9. The method of claim 1 wherein at least one of the multiple output channels comprises a string of LEDs.

10. The method of claim 9 wherein the channel control signals comprise pulse width modulation commands for dimming the string of LEDs.

11. The method of claim 1 further comprising storing energy in the storage element once for each output channel that has a state that requires energy.

12. The method of claim 11 further comprising:
directing current from all of the energy in the storage element to at least one of the output channels until it is empty; and
waiting for an idle period where the storage element remains empty before storing energy in the storage element for a next output channel that has a state that requires energy.

13. The method of claim 11 further comprising:
maintaining energy in the storage element during a freewheel period before storing energy in the storage element for a next output channel that has a state that requires energy.

14. The method of claim 1 further comprising storing energy in the storage element once for all output channels that have states that require energy.

15. A method for supplying energy to multiple output channels comprising:
monitoring a plurality of channel control signals to determine a state for each of the output channels;
connecting a single energy storage element to each output channel at a common node to provide a current to each output channel one channel at a time; and
delivering the current from the single energy storage element from the common node to the output channels according to each output channel's associated channel control signal.

16. The method of claim 15 wherein connecting the single energy storage element to each output channel comprises connecting the single energy storage element to each output channel independently.

17. The method of claim 15 further comprising charging the single energy storage element once for all of the output channels and providing the current to each output channel by discharging the single energy storage element to the output channels according to their associated channel control signals one channel at a time.

18. The method of claim 17 further comprising providing the current to each output channel by discharging the single energy storage element completely before charging the single energy storage element for a next output channel.

19. The method of claim 17 further comprising maintaining a charge in the single energy storage element during a freewheel period between discharging the single energy storage element to the output channels.

20. The method of claim 15 further comprising charging the single energy storage element once for each output channel that has an associated channel control signal that indicates energy is required and providing the current by discharging the single energy storage element to the output channel.

21. The method of claim 20 further comprising discharging the single energy storage element completely before a next charging cycle.

22. The method of claim 20 further comprising maintaining a charge in the single energy storage element during a freewheel period before a next charging cycle.

23. The method of claim 15 wherein the single energy storage element is an inductor.

24. The method of claim 15 further comprising:
monitoring a second plurality of channel control signals to determine a state for a second plurality of the output channels;
connecting a second energy storage element to each of the second plurality of output channels at a second common node to provide a second current to each of the second plurality of output channels one channel at a time; and
delivering the second current from the second energy storage element from the second common node to the output channels according to each output channel's associated channel control signal.

25. The method of claim 15 wherein delivering the current from the single energy storage element further comprises delivering energy from an energy source to the output channels according to each output channel's associated control signal.

26. The method of claim 15 wherein at least one of the output channels comprises a string of LEDs.

27. The method of claim 26 wherein the channel control signals comprise pulse width modulation commands for dimming the string of LEDs.

28. A circuit for supplying energy to multiple output channels comprising:
a current supplying circuit having an output connected to a common node and including a switch for controlling energy in a storage element;
a plurality of channel switches for directing a current from the energy in the storage element from the common node to an output channel associated with a respective channel switch;
a plurality of channel control inputs each associated with an output channel indicating a state for the output channel; and
a controller adapted to receive the plurality of channel control inputs and operate the switch and the plurality of channel switches to independently deliver the current to the output channels associated with channel control inputs according to the state of the output channel.

29. The circuit of claim 28 where the state indicates an on/off condition for the output channel.

30. The circuit of claim 28 where the state indicates an amount of current to be delivered to the output channel.

31. The circuit of claim 28 wherein the channel control inputs are channel enable inputs and the controller is adapted to receive the plurality of channel enable inputs and operate the switch and the plurality of channel switches to deliver the current from the energy in the storage element to the output channels associated with channel enable inputs that indicate that the output channel is enabled.

32. The circuit of claim 28 wherein the channel control inputs are analog dimming magnitude inputs and the controller is adapted to receive the analog dimming magnitude inputs and operate the switch and the plurality of channel switches to deliver the current from the energy in the storage element to the output channels according to an analog dimming magnitude indicated by the analog dimming magnitude inputs.

33. The circuit of claim 28 wherein the storage element is an inductor.

34. The circuit of claim 28 further comprising a power supply topology that includes the inductor selected from the group consisting of: a boost mode SIMO power supply, a flyback SIMO power supply, a forward SIMO power supply, a buck SIMO power supply, a buck-boost mode SIMO power supply, and a single ended primary inductor converter (SEPIC).

35. The circuit of claim 28 wherein the plurality of channel control inputs is selected from the group consisting of: a digital serial interface, a PWM interface, a digital input interface an analog input interface, and a pre-programmed internal controller interface.

36. The circuit of claim 28 further comprising a freewheel switch operated by the controller and adapted to sustain the energy in the storage element.

37. The circuit of claim 28 wherein at least one of the multiple output channels comprises a string of LEDs.

38. The circuit of claim 37 wherein the channel control inputs receive pulse width modulation commands used to dim the string of LEDs.

39. The circuit of claim 28 wherein the controller is adapted to operate the switch and the plurality of channel switches to deliver the current from the energy stored in the storage element and energy from an energy source to the output channels according to the state of the output channels.

* * * * *